US009697763B2

(12) United States Patent
Meisner

(10) Patent No.: US 9,697,763 B2
(45) Date of Patent: Jul. 4, 2017

(54) DISPLAYS INCLUDING ADDRESSIBLE TRACE STRUCTURES

(75) Inventor: Milton D. Meisner, Draper, UT (US)

(73) Assignee: MEISNER CONSULTING INC., Las Vegas, NV (US)

( * ) Notice: Subject to any disclaimer, the term of this patent is extended or adjusted under 35 U.S.C. 154(b) by 1513 days.

(21) Appl. No.: 12/024,822

(22) Filed: Feb. 1, 2008

(65) Prior Publication Data

US 2009/0051863 A1 Feb. 26, 2009

Related U.S. Application Data

(60) Provisional application No. 60/888,711, filed on Feb. 7, 2007, provisional application No. 60/914,950, filed on Apr. 30, 2007, provisional application No. 61/022,303, filed on Jan. 18, 2008.

(51) Int. Cl.
*G02F 1/1343* (2006.01)
*G09G 3/20* (2006.01)
*H01J 9/02* (2006.01)

(52) U.S. Cl.
CPC .............. *G09G 3/2096* (2013.01); *H01J 9/02* (2013.01); *G09G 2300/0426* (2013.01); *G09G 2300/0439* (2013.01); *G09G 2310/0267* (2013.01); *G09G 2310/0275* (2013.01)

(58) Field of Classification Search
CPC ........................................................ H01J 9/02
USPC .................. 349/143; 345/208; 313/504, 505; 359/245
See application file for complete search history.

(56) References Cited

U.S. PATENT DOCUMENTS 3,944,332 A * 3/1976 Tutihasi et al. ................. 349/26
5,410,371 A 4/1995 Lambert
5,473,338 A 12/1995 Prince et al.
5,596,344 A 1/1997 Kuwata et al.
5,610,667 A 3/1997 Hush
5,635,988 A 6/1997 Hush
5,638,085 A 6/1997 Hush et al.
(Continued)

FOREIGN PATENT DOCUMENTS

EP 1640960 3/2006
JP 2006099070 4/2006

*Primary Examiner* — Jerry Blevins
(74) *Attorney, Agent, or Firm* — Maschoff Brennan

(57) ABSTRACT

The present invention relates to displays including resonant trace structures. Displays are disclosed that include a first array of first electrically conductive traces configured to conduct alternating current, each of the first electrically conductive traces can be coupled to a first microelectromechanical system (MEM) surface acoustic wave (SAW) frequency selective filter. The displays further include a second array of second electrically conductive traces configured to conduct alternating current, each of the second electrically conductive traces can be coupled to a second microelectromechanical system (MEM) surface acoustic wave (SAW) frequency selective filter. The displays further include a material located between at least a portion of the first array and the second array, the material having a property that changes to cause illumination at points of intersection between the first array and the second array in response to current conducted in one or more of the first electrically conductive traces and current conducted in one or more of the second electrically conductive traces.

34 Claims, 20 Drawing Sheets

(56) References Cited

U.S. PATENT DOCUMENTS

| | | | |
|---|---|---|---|
| 5,644,340 | A | 7/1997 | Harney |
| 5,682,177 | A | 10/1997 | Kuwata et al. |
| 5,745,093 | A | 4/1998 | Tsuzuki et al. |
| 5,844,535 | A | 12/1998 | Itoh et al. |
| 5,861,869 | A | 1/1999 | Scheffer et al. |
| 5,892,425 | A | 4/1999 | Kuhn et al. |
| 5,949,841 | A | 9/1999 | Park |
| 5,977,961 | A | 11/1999 | Rindal |
| 6,014,124 | A | 1/2000 | Dickinson et al. |
| 6,028,977 | A | 2/2000 | Newsome |
| 6,055,022 | A | 4/2000 | Hush |
| 6,057,814 | A | 5/2000 | Kalt |
| 6,130,420 | A | 10/2000 | Tanaka et al. |
| 6,249,332 | B1 | 6/2001 | Bryan-Brown et al. |
| 6,317,108 | B1 | 11/2001 | Kalt |
| 6,456,281 | B1 | 9/2002 | Rindal |
| 6,456,348 | B2 | 9/2002 | Bryan-Brown et al. |
| 6,524,113 | B1 | 2/2003 | Oka |
| 6,714,273 | B2 | 3/2004 | Bryan-Brown et al. |
| 6,771,237 | B1 | 8/2004 | Kalt |
| 7,102,605 | B2 | 9/2006 | Stumbo et al. |
| 2002/0158814 | A1 | 10/2002 | Bright et al. |
| 2004/0114060 | A1* | 6/2004 | Kim et al. ...................... 349/44 |
| 2005/0105038 | A1* | 5/2005 | Kondo et al. ................ 349/156 |

* cited by examiner

DISPLAYS INCLUDING ADDRESSIBLE TRACE STRUCTURES

CROSS-REFERENCE TO RELATED APPLICATIONS

This application also the benefit of U.S. Provisional Patent Application Ser. No. 60/888,711, filed Feb. 7, 2007, claims the benefit of U.S. Provisional Patent Application Ser. No. 60/914,950, filed Apr. 30, 2007, and claims the benefit of U.S. Provisional Patent Application Ser. No. 61/022,303, filed Jan. 18, 2008. The contents of all of the aforementioned applications are incorporated by reference herein.

BACKGROUND

Dense circuit matrices typically contain row and column addressed integrated circuits. Addressing locations on dense circuit matrices are applicable to many different devices. For example, dense circuit matrices are often implemented in flat panel displays, charge-coupled devices (CCDs) such as digital cameras, deep space imagery from telescopes, microscopy, memory chips, electronic paper, heated pixel arrays, selective high density radio signal routing, and for selective curing of heat- or electro-sensitive materials. These integrated circuits, as well as many others, typically include trace connections for each coordinate, which, even at moderate complexity levels, require multiple layers of circuitry patterns to ensure isolation of each signal. As such, multiple layers requiring mechanical connections have an increased complexity and incidence of continuity errors.

Accordingly, current technology has been limited in many respects. For example, resolution, size, and profile of array-dependent constructs are limited because of the large amount of components that are required for addressing a location on the dense circuit matrix. A result of these limitations is increased circuit tracing complexity. Moreover, the manufacture of these constructs with moderate to high circuit tracing complexity levels is time-consuming and requires complicated mechanical work and expensive manufacturing equipment.

For example, with regard to display applications, from its earliest inception, the Cathode Ray Tube (CRT) display remained the simplest display platform for graphic displays. In CRT technology, electrons are generated off of a tungsten filament in a vacuum tube, accelerated by a voltage differential through a focusing coil and diverted vertically and horizontally through biased electric fields in a consecutive scanning mode. Radio signals are embedded directly into the synchronized scan mode as time and amplitude modulations and the electrons were decelerated against a screen of various phosphors which convert most of the electron energy into a lighted pixel. CRT displays include a box like bulk, however, that quickly became an unwanted aspect as electronics for radio and computer chassis became smaller.

As transistors became smaller and cheaper to fabricate, the possibility of fabricating miniaturized discrete pixel cells into relatively flat compact architectures became a reality. One of the first means of generating pixels involved the use of a newly exploited property called liquid crystals. The repetitive parallel units in a liquid crystal can be stimulated by electric field lines into linear alignment with the field. When multiple alignments occur as a pixel gate for light, only the light polarization which corresponds with the liquid crystal alignment will be transmitted, orthogonally polarized light being cancelled. In this manner, light and dark areas can be built up into image arrays that represent alphanumeric symbols or other images. Calculators, registers, and games began utilizing reflected light liquid crystal displays (LCDs), to be followed soon by back lit displays, and subsequently color filtered red green blue (RGB) displays. Nematic LCD technology has improved greatly over the last 25 years, with better signal responses and broader emission angles, and has remained competitive with plasma displays.

Plasma displays can be described as thousands of miniature fluorescent light cells that are turned on and off by higher voltage electrodes. In plasma displays, the same gasses used for neon signage are used in tiny isolated micro pixel cells. Plasma displays are fairly efficient but relatively expensive to fabricate. LCDs are slightly cheaper to fabricate but use a larger amount of wattage per lumen because of circuit complexities employing large numbers of solid state transistors. Current losses are also associated with the randomizing and ordering of the liquid crystals themselves. Also, realizing that backlit emission continues whether or not a pixel light gate is open or closed, energy losses become quite significant, especially with small compact portable devices such as laptop computers.

Several new approaches to simplifying the efficiencies of flat panel displays are currently being researched. Organic light-emitting diodes can be miniaturized by several common printing techniques. However, problems due to complexity and transistor energy losses still remain as an upper limit.

The subject matter claimed herein is not limited to embodiments that solve any particular disadvantages or that operate only in particular environments such as those described herein. Rather, such environments and disadvantages are provided only to illustrate examples of technology areas in which several embodiments may be practiced.

SUMMARY OF THE INVENTION

The present invention relates to displays including resonant trace structures. Displays are disclosed that include a first array of first electrically conductive traces configured to conduct alternating current, each of the first electrically conductive traces being coupled to a first microelectromechanical system (MEM) surface acoustic wave (SAW) frequency selective filter. The displays further include a second array of second electrically conductive traces configured to conduct alternating current, each of the second electrically conductive traces being coupled to a second microelectromechanical system (MEM) surface acoustic wave (SAW) frequency selective filter. The displays further include a material located between at least a portion of the first array and the second array, the material having a property that changes to cause illumination at points of intersection between the first array and the second array in response to current conducted in one or more of the first electrically conductive traces and current conducted in one or more of the second electrically conductive traces.

Additional displays are disclosed that include a first array of first electrically conductive traces, the first array of first electrically conductive traces configured to conduct an alternating current, each of the first electrically conductive traces having a different associated characteristic resonant frequency. The displays further include a first signal generator configured to generate a first clock synchronized frequency sweeping signal. The displays further include a first gate configured to open in response to a first trigger signal to allow a first frequency selected portion of the first clock synchronized frequency sweeping signal to pass the first gate and be conducted to the first array of first electrically conductive traces. The displays further include a second array of second electrically conductive traces configured to conduct an alternating current, each of the second electrically conductive traces having a different associated characteristic resonant frequency, wherein intersections of the first electrically conductive traces and the second electrically conductive traces define a two-dimensional grid of pixels of the display. The displays further include a second gate configured to open in response to a second trigger signal to allow a second frequency selected portion of the first clock synchronized frequency sweeping signal, or an additional frequency sweeping signal, to pass the second gate and be conducted to the second array of second electrically conductive traces. The displays further include a material located between at least a portion of the first array and at least a portion of the second array, the material having a property that changes in response to a stimulus to cause illumination.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1C illustrates a display including a resonant frequency matrix according to an example embodiment;

FIG. 2C illustrates a resonant frequency matrix according to an example embodiment;

DETAILED DESCRIPTION OF THE PREFERRED EMBODIMENTS

Figure 1A:
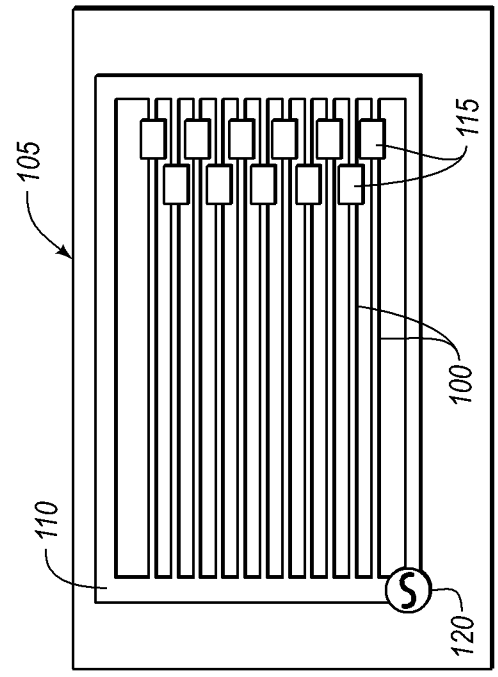
FIGS. 1A, 1B, and 1C illustrate an example of a method for manufacturing a resonant frequency matrix.

The principles of the embodiments disclosed herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

Embodiments disclosed herein relate to simplifying and reducing the number of discrete traces used for addressing rows and columns in a matrix. The invention disclosed herein can exponentially reduce the conventional need for individual row and column drivers. In contrast to the relatively limiting and costly complex row and column constructs presently used in the industry, several embodiments can also reduce thickness. For example, some embodiments include a nearly paper-thin and high resolution matrix replacement consisting of a resonant frequency (RF)-activated Cartesian array of multiple circuit elements. With appropriate shielding and activation, such embodiments can result in rapid intersection power transmissions at resolutions ranging from 1 to 2000 lines per inch or more (depending on the structure of the array and subsequent signaling patterns) with such resolutions being limited only by material and manufacturing processes.

The embodiments disclosed herein are based upon established principles of physics applied in modern electronics in areas such as circuit tuning for AM and FM radio and television signals. Several embodiments affix multiple circuit elements, such as, but not limited to, parallel traces for addressing locations of a matrix, either by mounted or integrated architectures of stepped capacitive value or stepped inductive value, into parallel or series circuit arrays.

In this manner, each trace can have its own discrete inductive or capacitive value associated thereto and, as a result, an associated characteristic resonant frequency, thereby allowing for the resonant frequency filtering utilized in and exploited by this invention through Cartesian intersection. A plurality of frequencies can be sent through a central signal bus, thereby eliminating the need for many individually discrete multiples of traces for each row and column. In such embodiments, rows and columns can be increased in density and simultaneously decreased in circuit complexity, since a single bus drives each array. This RF-activated circuit construct can be tailored or customized with material selection best suited to the requirements of a given application.

Detail and resolution controls are also extremely broad ranged. This invention can be effected at any resolution limited only by the availability of size for the non-conductive base material, the resolution capability of the machinery used to apply or deposit the conductive medium, and the specifications for efficacy in the conductive medium itself, such as thickness at which said medium retains its functionality appropriate to the application. Constant new developments in the conductive polymer field and in carbon nanotubes provide ever-increasing possibilities for applications and refinements for the RF-activated matrix envisioned by the embodiments discussed herein.

I. Example Constructions of Two-Dimensional Resonant Frequency Matrix Embodiments Several embodiments discussed herein affix multiple circuit elements, for example by either mounted or integrated architectures of stepped capacitive values or stepped inductive values, into parallel or series circuit arrays. In this manner, each trace can have its own discrete associated inductive and/or capacitive value and associated characteristic resonant frequency corresponding thereto. These architectures allow for resonant frequency filtering utilized through Cartesian intersection. Additional steps and structures may be added as are common or would be known to one of ordinary skill after reading this disclosure.

Figure 1B:
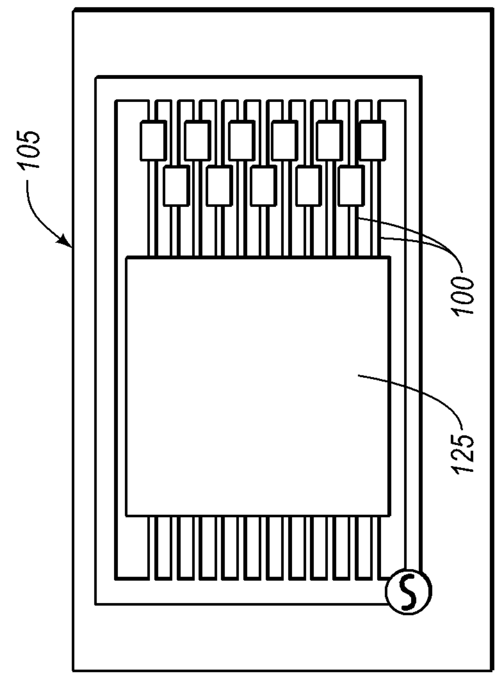
Figure 1C:
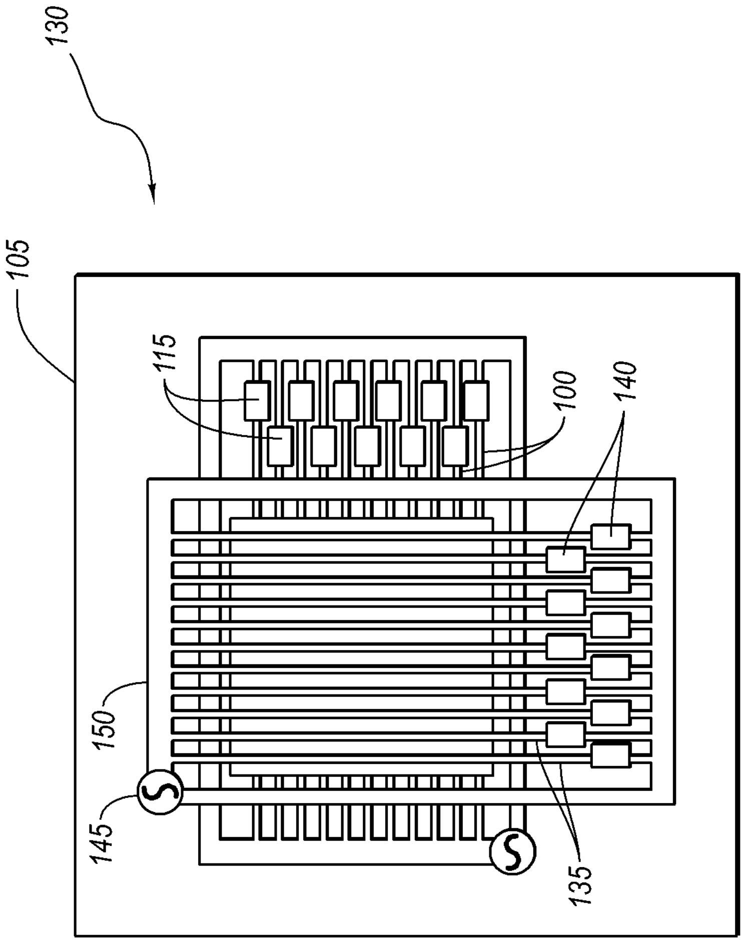

Referring to FIGS. 1A, 1B, and 1C, a method for manufacturing a resonant frequency matrix is illustrated. Referring to FIG. 1A, an X-axis trace array 100 is produced on a non-conductive substrate 105. X-/Y-axis coordinates are used for illustrative purposes only and are not to be considered limiting to the scope of the present invention. The non-conductive substrate 105 supports the circuit components and can be at least partially made of materials such as glass, plastic, and/or ceramic.

A first signal bus 110 is produced on the substrate 105. The first signal bus 110 is configured to conduct an alternating current of a wide range of frequencies to (or from) the X-axis trace array 100 as illustrated in FIG. 1A. Each of the traces in array 100 is electrically coupled to a frequency selective filter 115. The filters 115 can include, for example, capacitors, inductors, and/or other devices such as microelectromechanical systems that are configured to filter electrical signals of different frequencies. Each of the subsequent filters 115 in the array 100 can be configured to conduct an alternating current transmitted at a gradually higher (or gradually lower) frequency.

An X-axis controller 120 is electrically coupled to the bus 110. The X-axis controller 120 is configured to generate alternating current signals at different frequencies to the filters 115 via the bus 110. It should be appreciated that the controller 120 can be located on the same substrate 105 as the resulting resonant frequency matrix or a separate substrate than the resonant frequency matrix with electrical connections for providing the alternating current to the bus 110 according to any of the embodiments discussed herein.

A reactive material is any material that responds to matrix stimulation. It should be apparent to one of ordinary skill in the art that the active material may still be considered reactive.

Referring to FIG. 1B, a material 125 is produced over at least a portion of the X-axis trace array 100. The material 125 can be a sheet of material, as shown, that changes a property of the material when a stimulus is received from the matrix. The stimulus can be a current conducted by traces located both above and below the material 125. According to some embodiments, the material 125 can be a sheet of material that emits electromagnetic radiation (or causes electro-magnetic radiation to be emitted), such as light, in response to currents conducted by traces located both above and below the material 125.

The material 125 reacts to a stimulus caused by conduction of current, or heat generated by conduction of the current in the traces, and changes a property of the material 125 as a result. The property of the material 125 can be, for example, a chemical property, spectral property, electric property, piezoelectric property, mechanical property, optical property, biological property, heat activated color, elasticity of the material, a luminescence of the material for displaying an image, or wherein the property of the material responds to light as part of a charged coupled device, as well as other material properties. According to one example embodiment, the material 125 is an electro-luminescent material, which responds to an alternating current signal where X- and Y-traces cross with resonant gains by changing an optical property and inducing photon emission from a change in electronic energy states which causes emission of electromagnetic radiation as visible light. Light that is visible to humans typically has a wavelength between about 4000 and 7700 angstroms.

The material 125 may also be applied at discrete points as in a patterned sequence of the material 125. For example, the material 125 may be applied at discrete points (or "islands" of material) in a patterned sequence using various materials with different properties, such as density or luminous color, printed upon a carrier film. The material 125 applied at discrete points or manufactured in a sheet may be a combination of materials having different properties that change in response to a stimulus, or the combination of materials can be different materials that react to different stimulus. In some embodiments, the material 125 applied at discrete points or manufactured in a sheet, or provided in a different configuration such as islands of material 125, may be a combination of materials having different luminous properties that emit electromagnetic radiation in response to currents conducted by traces proximate to the materials. For example, in such embodiments, each island deposit of material 125 can correspond to a pixel of a certain property (e.g. spectral) value.

Referring to FIG. 1C, a resonant frequency matrix 130 is illustrated according to an example embodiment. The resonant frequency matrix 130 is a result of the processes illustrated in FIGS. 1A and 1B along with the production of a Y-axis trace array 135 as shown in FIG. 1C. The Y-axis trace array 135 is produced over at least a portion of the sheet (or islands) of material 125 and the X-axis trace array 100. Similar to the X-axis trace array 100 illustrated in FIG. 1A, the Y-axis traces in array 135 are electrically coupled to a plurality of Y-axis resonant frequency filters 140. The Y-axis filters 140 selectively conduct alternating current to (or from) the Y-axis traces in array 135 based on the frequency of the alternating current.

The Y-axis trace array 135 can be produced such that the Y-axis traces are produced substantially perpendicular to the X-axis trace array 100. However, it will be appreciated that the X-axis trace array 100 and Y-axis trace array 135 can be configured to intersect at any angle, or even parallel, so long as at least one trace from the X-axis array and at least one trace from the Y-axis array at least partially overlay each other at one or more locations. The X-traces and Y-axis traces can also be configured parallel to each other in a side-by-side configuration. However, according to the example embodiment shown in FIG. 1C, each of the Y-axis traces in array 135 directly overlap each of the X-axis traces in a substantially perpendicular orientation to array 100 overlapping each other at a particular intersection.

A Y-axis controller 145 is electrically coupled to a bus 150 that is electrically coupled to the Y-axis filters 140. The Y-axis controller 145 is configured to generate alternating current signals to each of the Y-axis filters 140 via the bus 150. It should be appreciated that the Y-axis controller 145 can be located on the same substrate 105 as the resultant resonant frequency matrix 130 or on a separate substrate than the resonant frequency matrix 130 according to any of the embodiments discussed herein. The X-axis controller 120 and/or the Y-axis controller 145 can also be part of a single controller (or multiple controllers) that receives signals (such as video signals in some embodiments), decodes the signals into corresponding alternating currents to address the intersections of the X-axis and Y-axis trace arrays 100 and 135, and transmits the corresponding alternating currents to the X-axis and Y-axis trace arrays 100 and 135 according to this embodiment.

Each location of intersection of the X-axis trace array 100 and the Y-axis trace array 135 can be addressed by supplying a stimulating current of a selected frequency from the X-axis controller 120 to pass through the corresponding X-axis filter 115 coupled to a particular a X-axis trace 100; and also supplying a stimulating current of a selected frequency from the Y-axis controller 145 to pass through the corresponding Y-axis filter 140 coupled to a particular one of the Y-axis traces 135. Thus a reaction of the material's 125 property can be induced at any point of intersection of the X-axis trace array 100 with the Y-axis trace array 135 by transmitting stimulating signals of an appropriate frequency to the X- and Y-axis busses 110 and 150 associated with the intersecting traces. Thus, an electromagnetic radiation emission, for example, can be induced at any number of points of intersection of the X-axis trace array 100 with the Y-axis trace array 135 by transmitting alternating currents of appropriate frequencies to the X- and Y-axis busses 110 and 150 associated with the intersecting traces to display an image.

Figure 2B:
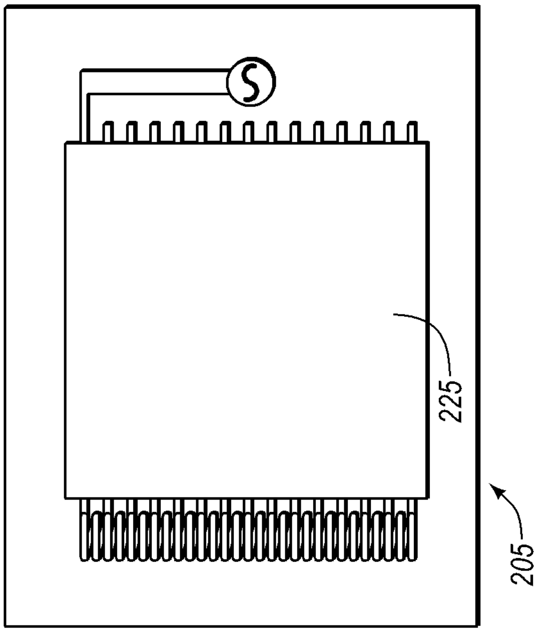
FIGS. 2A, 2B, and 2C illustrate an example of a method for manufacturing a resonant frequency matrix.
Figure 2A:
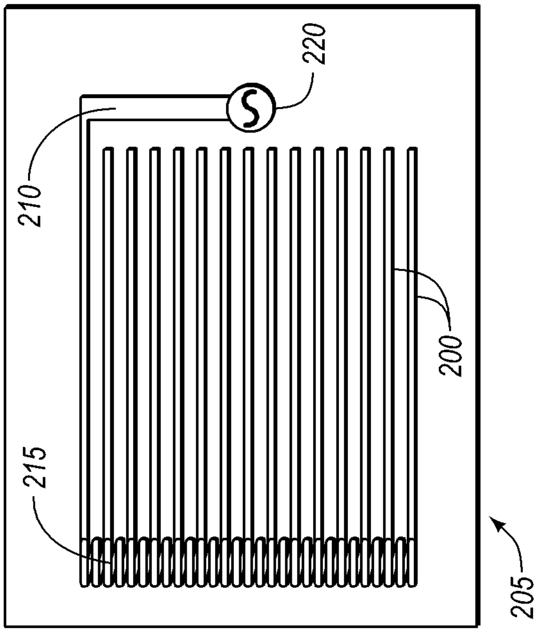
Figure 2C:
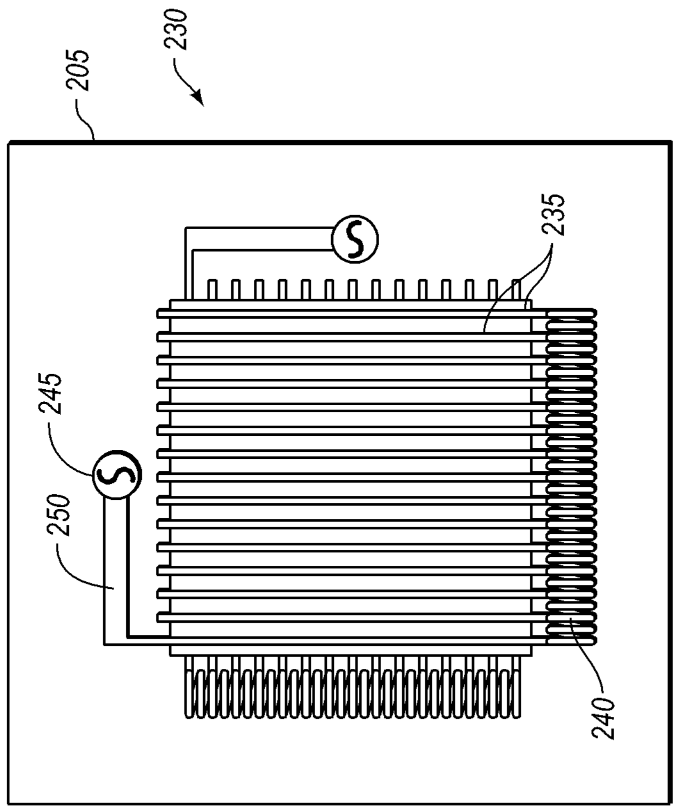

Referring to FIGS. 2A, 2B, and 2C, a method for manufacturing a resonant frequency matrix is illustrated. The embodiments illustrated in FIGS. 2A, 2B, and 2C are different than the illustrations in FIGS. 1A, 1B, and 1C in that they utilize multiple-tapped single inductors for addressing each trace array rather than individually mounted inductors or capacitors and can be alternately configured as a series dipole array. Referring to FIG. 2A, an X-axis trace array 200 is produced on a non-conductive substrate 205. The non-conductive substrate 205 supports the circuit components and can be made at least partially of materials such as glass, plastic, and/or ceramic.

A first signal bus 210 is produced on the substrate 205. The first signal bus 210 conducts a wide range of frequencies to the X-axis trace array 200 as illustrated in FIG. 2A. Each of the traces in array 200 is electrically coupled to an X-axis multiple-tapped inductor 215 along the length of the inductor 215 at a location for gradually increasing inductance values. Thus, each of the subsequent traces in the array 200 can be configured to conduct a frequency of an alternating current at a gradually higher frequency. An X-axis controller 220 is electrically coupled to the bus 210. In reactive embodiments, the X-axis controller 220 is configured to generate alternating current signals to the multi-tapped inductor 215 via the bus 210. In active embodiments, the X-axis controller 220 is configured to receive a stimulus from the X-axis trace array 200 via the bus 210.

Referring to FIG. 2B, a material 225 is produced over the X-axis trace array 200. The material changes a property in response to a stimulus. The material 225 can be a sheet of material (or discrete islands of material) that reacts when a current is conducted across traces located directly above and below the material 225. For example, the material can be a material that reacts to electricity or heat generated by the alternating currents and changes a property of the material as a result. For example, the property of the material can be a chemical property, spectral property, optical property, electric property, piezoelectric property, biological property, thermal property, mechanical property, thermal expansion of the material, and/or luminescence of the material as well as other material properties. According to some embodiments, the material 225 can be a sheet of material (or discrete islands of material) that emits electromagnetic radiation (or causes electro-magnetic radiation to be emitted) when a current is conducted across traces located directly above and below the material 225. For example, the material 225 can be a material that reacts to electricity or heat generated by the alternating currents and that emits light in response.

Referring to FIG. 2C, a resonant frequency matrix 230 is illustrated according to an example embodiment. The resonant frequency matrix 230 is a result of the processes illustrated in FIGS. 2A and 2B along with the production of a Y-axis trace array 235 as shown in FIG. 2C. The Y-axis trace array 235 is produced over at least a portion of the sheet (or islands) of material 225 and the X-axis trace array 200. Similar to the X-axis trace array 200 illustrated in FIG. 2A, the Y-axis traces in array 235 are electrically coupled to a single Y-axis multi-tapped inductor 240. The multi-tapped inductor 240 selectively conducts alternating current to (or from) the Y-axis traces in array 235 based on the frequency of the alternating current.

A Y-axis controller 245 is electrically coupled to a Y-axis bus 250 coupled to the Y-axis inductor 240. The Y-axis controller 245 is configured to generate alternating current signals to the Y-axis inductor 240 via the Y-axis bus 250. It should be appreciated that the Y-axis controller 245 can be located on the same substrate 205 as the resonant frequency matrix 230 or on a separate substrate than the resonant frequency matrix 230 with an electrical connection to the Y-axis bus 250. The X-axis and Y-axis controllers 220 and 245 can be part of a single controller (or multiple controllers), such as a video controller that receives video signals and decodes the video signals to transmit the corresponding alternating currents to display images representing the video signals according to some embodiments.

The Y-axis trace array 235 can be produced such that its traces are produced substantially perpendicular (or at any angle) to the X-axis trace array 200. However, it will be appreciated that the X-axis trace array 200 and Y-axis trace array 235 can be configured to intersect at any angle, or even parallel, so long as at least one trace from the X-axis array 200 and at least one trace from the Y-axis array 235 are adjacent to each other at one location. The X-axis traces 200 and Y-axis traces 235 can also be configured parallel to each other in a side-by-side configuration having active or reactive material there between. Thus, the X-axis traces 200 and Y-axis traces 235 can be arranged in any configuration so long as they are adjacent to the material 225 in at least one location.

As shown in FIG. 2C, in this embodiment each of the Y-axis traces 235 directly overlap each of the X-axis traces 200 at a particular point. Each point of intersection of the X-axis trace array 200 and the Y-axis trace array 235 can be addressed by supplying currents of a selected frequency to pass the associated tap of the X-axis inductor 215 to a particular X-axis trace 200 associated with the selected frequency, and a current of a selected frequency to pass the associated tap of the Y-axis inductor 240 coupled to a particular Y-axis trace 235 associated with the selected frequency. Thus, an emission of light from the material 225 can be induced at any of the intersections of the X-axis trace array 200 with the Y-axis trace array 235 by transmitting signals of selected frequencies to the X- and Y-axis busses 210 and 250. Multi-tapped single inductors 215 and 240 simplify the number of individually mounted components and instead rely on conductive bonds from individual multiple traces (taps) on a central column of windings.

As illustrated in FIGS. 1C and 2C, a plurality of frequencies can be sent through a central signal bus for each axis, the signal bus may be of a parallel or series dipole arrangement. Depending on the type of arrangement lends itself to the least circuit resistance associated with specific frequency choices, thereby eliminating the need for many individually discrete multiples of traces for each row and column. Accordingly, rows and columns can be increased in density and simultaneously decreased in circuit complexity since a single bus drives the arrays of multiple traces. In addition, capacitors can be printed or etched directly onto the insulated substrate to further reduce the necessity for mounted components.

Existing surface mount inductors and capacitors, for example, common to cell phones and computers, now have relatively low manufacturing costs and can be used to construct the resonant filters for each trace. A mixed plurality of bus switching and resonant filters may also be employed where cost and/or convenience are considerations. However, resonant frequency addressing can be used to great advantage in many different applications and configurations.

Surface mount inductors can be applied by existing automated equipment either individually or as complimentary resonant structures for capacitors onto preprinted circuit traces for the purposes of discrete trace array member frequency filters. For example, inductors of only a few values can be combined in series to produce a unique higher total inductance and thereby lower resonance than those of the individual inductors. Likewise, capacitors can be combined to produce higher capacities with corresponding lower resonant frequencies than individual capacitors. Inductors can be mounted individually per each trace or can tap sections of a single continuous inductor.

One advantageous aspect is that an oscillating signal is employed directly to each pixel (i.e. trace intersection point) by resonant addressing. Thus, subsequent conversion to a local pixel needing direct current is unnecessary for many applications, such as for purposes of activating electroluminescent or plasma light emission. Thus, component number can be reduced and circuit manufacture and complexity can be simplified, thereby reducing cost and size among other benefits.

Various media are suitable for the creation of the matrices and have predetermined conductive characteristics, which can be selectively formulated, modified, and subsequently selected as appropriate to suit the ultimate desired application of the RF activation technology. New developments in the conductive polymer field and carbon nanotubes can be used in many applications and refinements for this resonant frequency matrix, as would be known to one of ordinary skill in the art after reading this disclosure.

The manner of each trace having its own discrete inductive or capacitive value associated thereto, allows for resonant frequency filtering, and a plurality of frequencies can be sent, through a central signal bus. This eliminates the need for many individually discrete multiples of traces for each row and column. Accordingly, rows and columns can be dramatically increased in density and simultaneously decreased in circuit complexity.

Carbon nanotubes can be grown vertically on a Z axis display layer connecting X and Y intersections, which can have emissive phosphor terminations enabling them to emit light as well. This enables the resonant frequency matrix to function as a CCD. If the phosphor terminations of the carbon nanotubes are eliminated, the vertical carbon nanotubes will render a net pixel gain upon absorption of light thereby increasing the signal strength from each discrete pixel location accordingly. Likewise, selenium or other light activated conductively enhanced material will also absorb photons increasing the local pixel signal strength as a gain, collectively enabling the resonant frequency matrix as a CCD.

An entire row, or multiple rows, can be activated creating pixel activation for that row. Also, any frequencies, or range of frequencies, can be implemented to activate the material in FIGS. 1A-2C. However, one range of frequencies may be more advantageous than another depending on the embodiment and the type of material being activated as discussed in further detail below with regard to particular embodiments and/or applications.

Figure 2D:
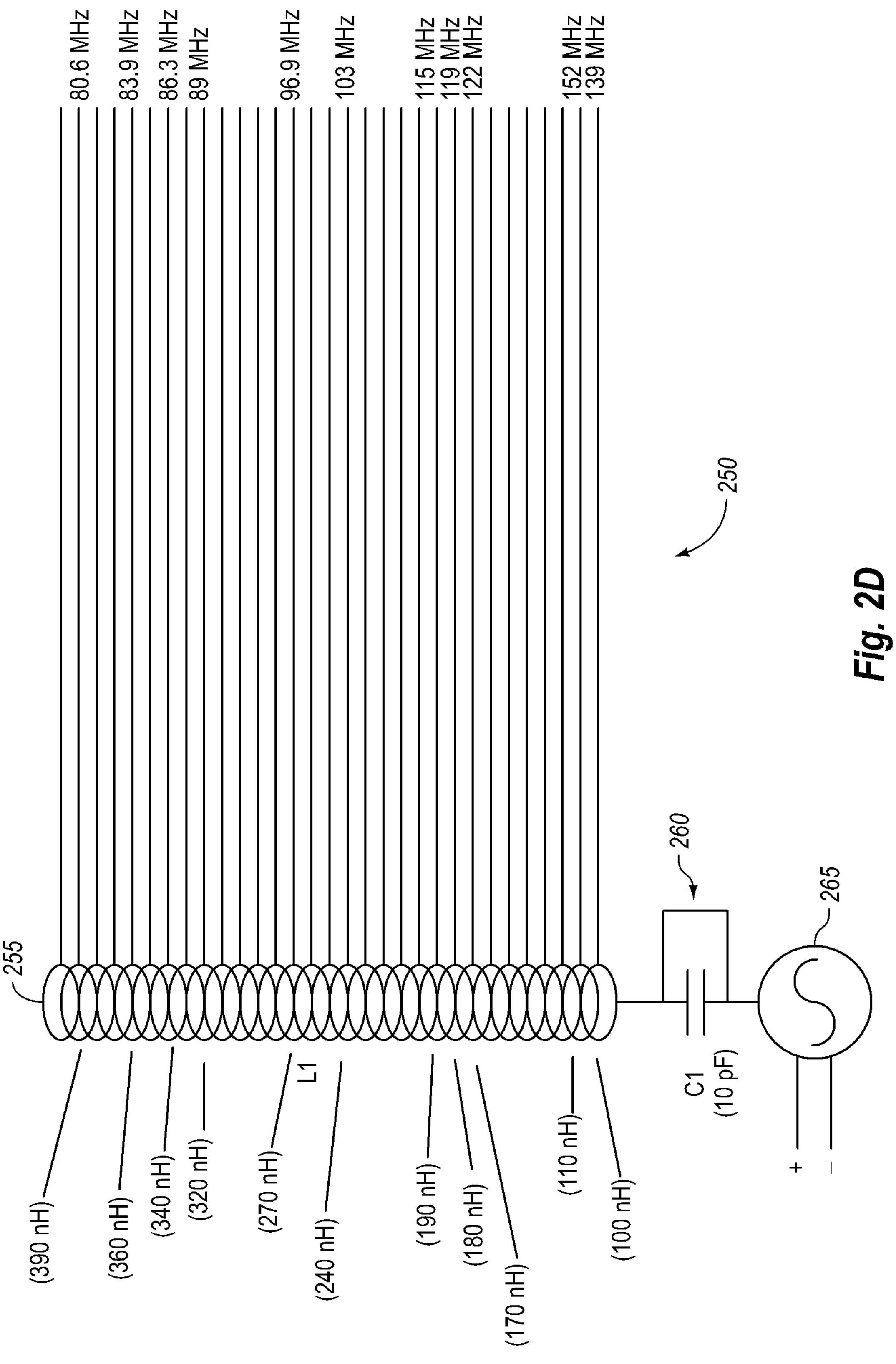
FIG. 2D illustrates a trace array including an LC.

For example, referring to FIG. 2D, an example of a trace array 250 is illustrated that includes a multi-tapped inductor 255 coupled to a capacitor 260 and controller 265 constituting a LC circuit driver for receiving a signal and providing the activation energy having a particular trace associated frequency to the multi-tapped inductor 255. As illustrated by FIG. 2D, the example multi-tapped trace array 250 shown can have graduated trace associated inductive values ranging from about 100 nano-Henry (nH) to about 1270 nH resulting in associated index tapped frequencies ranging from 159 megahertz (MHz) to 80.6 MHz respectively. The trace array 250 illustrated in FIG. 2D is shown to illustrate an embodiment of the invention with an example range of inductive values which can be used. However, any range of inductive values and trace associated frequencies can be used.

Additional procedures and/or components can be used to deliver additional activation energy to the material located at each intersection. For example, two such strategies include broadening the band gap between frequencies, and/or adding one or more additional multi-tapped inductors to the circuit. By adding one or more multi-tapped inductors, for example, the field values to each trace can be increased on a narrower band gap of frequencies.

Figure 2E:
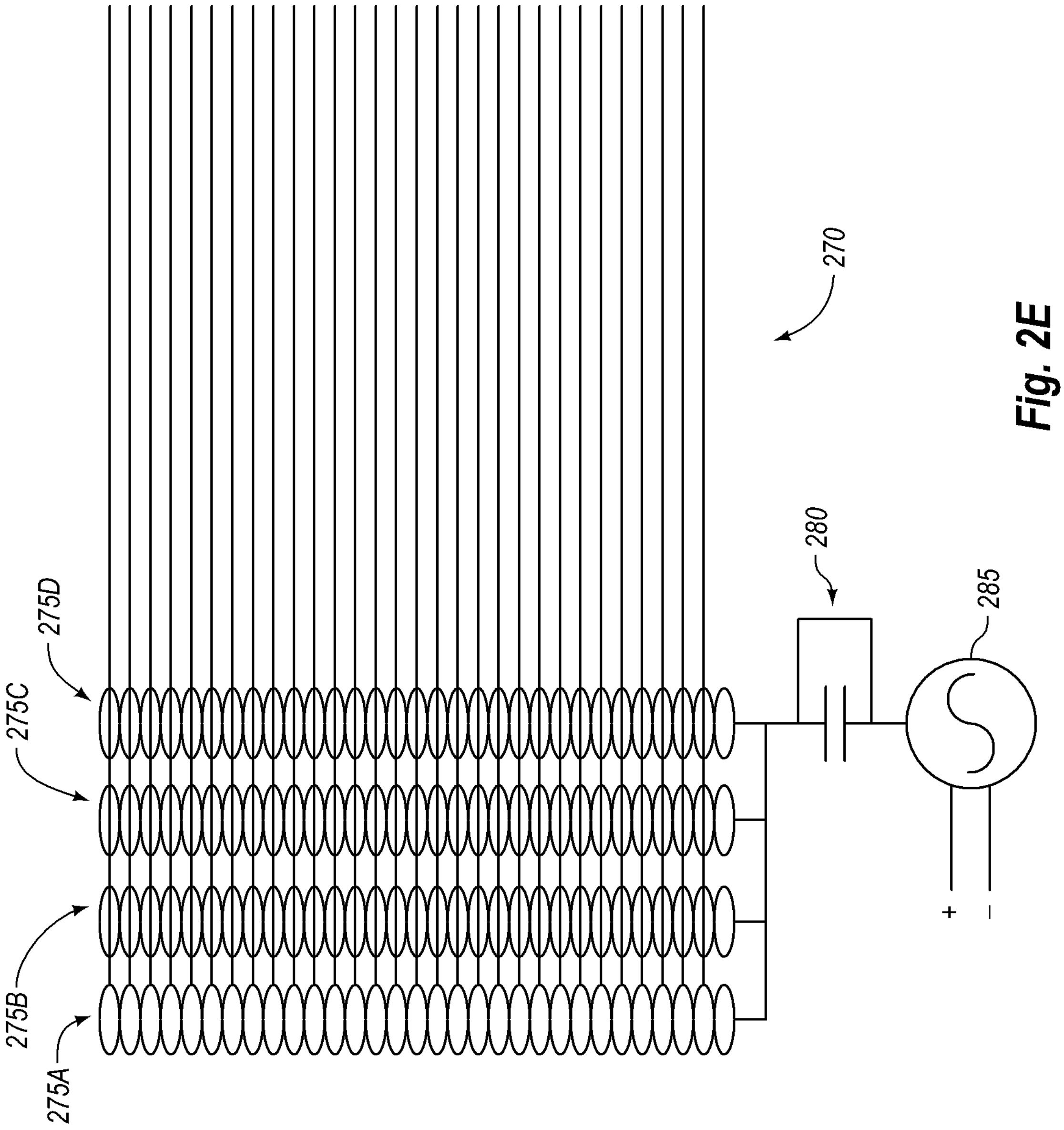
FIG. 2E illustrates a trace array including multiple multi-tapped inductors.

For example, referring to FIG. 2E, an example of a trace array 270 implementing multiple multi-tapped inductors 275A, 275B, 275C, and 275D is illustrated. The multi-tapped inductors 275A, 275B, 275C, and 275D are coupled to a capacitor 280 and a controller 285 for receiving a signal and providing an activation energy to the multi-tapped inductors 275A, 275B, 275C, and 275D such that the energy reaches the associated trace. Further note that the multi-tapped inductors 275A, 275B, 275C, and 275D in FIG. 2E have the same inductance and identical number of windings where taps are connected respectively thereto. The multi-tapped inductors 275A, 275B, 275C, and 275D may also include a ferrite material in any of their cores thereby introducing additional paramagnetic benefits.

For example, embodiments employing full spectrum simultaneous frequencies, the capacitor 280 can have a fixed capacitive value. However, for other embodiments, for example embodiments employing sequential frequencies, the capacitor 280 can have a variable capacitive value, such as a varactor capacitor which may be particularly advantageous due to the varactor capacitor's nonlinearity.

While the trace arrays 250 and 270 illustrated in FIGS. 2D and 2E may appear to be X-axis trace arrays, the teachings are applicable to X-axis, Y-axis, and other multi-tapped trace arrays disclosed herein no matter what orientation the traces are disposed. Moreover, any number of multi-tapped inductors may be used. For example, 1, 2, 3, 4, or many more multi-tapped inductors may be used.

Other components for selectively addressing a trace array based on the associated frequency of the generated signal can be used. Several embodiments disclosed herein implement microelectromechanical systems (MEMS) for frequency addressing the trace arrays. MEMS are also referred to as micromechanics, micro machines, or micro systems technology (MST). The MEMs disclosed herein can be fabricated using deposition processes, photolithography, etching processes, reactive ion etching, deep reactive ion etching, or any other process disclosed herein or otherwise known for manufacturing MEMs. According to several embodiments, MEM surface acoustic wave (SAW) devices are used for addressing the traces. Additional electrical components may be added to condition, control, convert, amplify, or otherwise optimize the signals transmitted to the material.

Figure 3A:
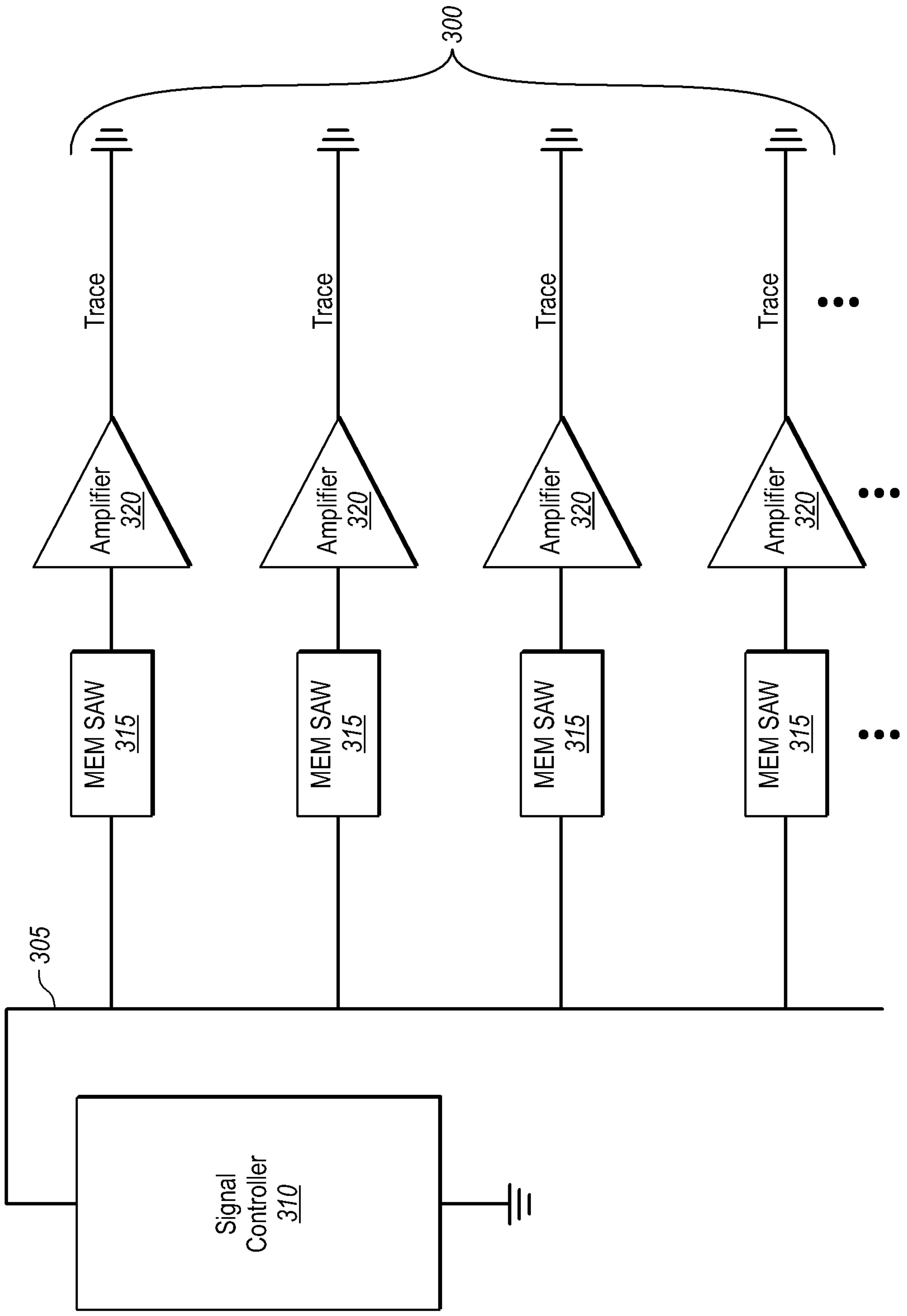
FIG. 3A illustrates a trace array including micro-mechanical machined surface acoustic wave devices.

For example, referring to FIG. 3A, an embodiment of the present invention is illustrated. The embodiment illustrated in FIG. 3A includes a trace array 300. The trace array 300 may be an X-axis or Y-axis trace array such as those shown in the previous embodiments and may be supported by a substrate. The trace array 300 can be produced adjacent to a reactive or active material as disclosed herein. A signal bus 305 is configured to conduct an alternating current of a wide range of frequencies to (or from) the trace array 300 as illustrated in FIG. 3A. Each of the traces in array 300 is electrically coupled to a MEM SAW 315. Each of the subsequent MEM SAWs 315 in the trace array 300 can be configured to conduct an alternating current transmitted at a gradually higher (or gradually lower) frequency.

A signal controller 310 is electrically coupled to the bus 305. The controller 310 is configured to generate alternating current signals at different frequencies to the MEM SAWs 315 via the bus 305. According to the embodiment illustrated in FIG. 3, amplifiers 320 are also implemented for amplifying signals transmitted to the trace array 300. Thus, the MEM SAWs 315 illustrated in FIG. 3A have tuned resonance to different frequencies which correspond to matching frequencies generated by the controller 300.

In display embodiments, the individual traces 300 can be selectively activated, or not activated, for example to generate an image on the display in which the trace array 300 of FIG. 3A is implemented. MEM SAWs 315 in such embodiments are utilized as a substitute for an LCR type filter circuit which can be miniaturized to produce additional advantages of low phase noise and excellent frequency isolation. According to one embodiment, frequencies between 30 Hz and 30 GHz are used to address the trace array 300 to activate the reactive material. Thus, each of the MEM SAWs 315 are associated with a gradually higher or gradually lower frequency between 30 Hz and 30 GHz according to this example embodiment. The frequencies used may depend on the types of materials and components to optimize different embodiments per teachings disclosed herein. Other types of modulation, such as amplitude modulation, can also be used to address traces within the matrices.

Means for extending the response of the material to a stimulus can be included. In display embodiments, the means for extending the response of the material to a stimulus may extend the duration of illumination of the material in response to a current conducted by traces located both above and below the material. For example, referring to FIG. 3B, the means for extending the response of the material 225 of FIG. 2C to a stimulus may be implemented as a layer of photoconductive material 325. In this embodiment, the layer of photoconductive material 325 is disposed between the first trace array 200 and the substrate 205. The photoconductive material 325 is coupled to a voltage source 330, which may be a floating voltage source. The photoconductive layer powers a lit pixel, for example, with the traces 200 and 235 having a subactivation floating voltage of polarity opposite to the voltage applied to the photoconductive material 325. The photoconductive material 325 can be a film of photoconductive material applied to the substrate 205.

The photoconductive material 325 is a material whose current-carrying ability is enhanced when illuminated. Examples of inorganic photoconductive materials include selenium, and several alloys such as, but not limited to, selenium with arsenic, tellurium, sulfur, or silver. There is also a broad range of organic photoconductive materials commonly used with photo copy machines, where the drum of a photo copy machine is coated with such photoconductive materials and becomes conductive when exposed to light. The same photoconductive materials used in photo copy machines may be suitable as the additional film layer 325 beneath, or otherwise adjacent to, the traces 200. The resonant frequency matrix can be constructed in any shape, size, configuration, and can include any combination, permutation, and multiplicity of the different elements and teachings set forth herein. The coil material can include any suitable conductive material.

Figure 4:
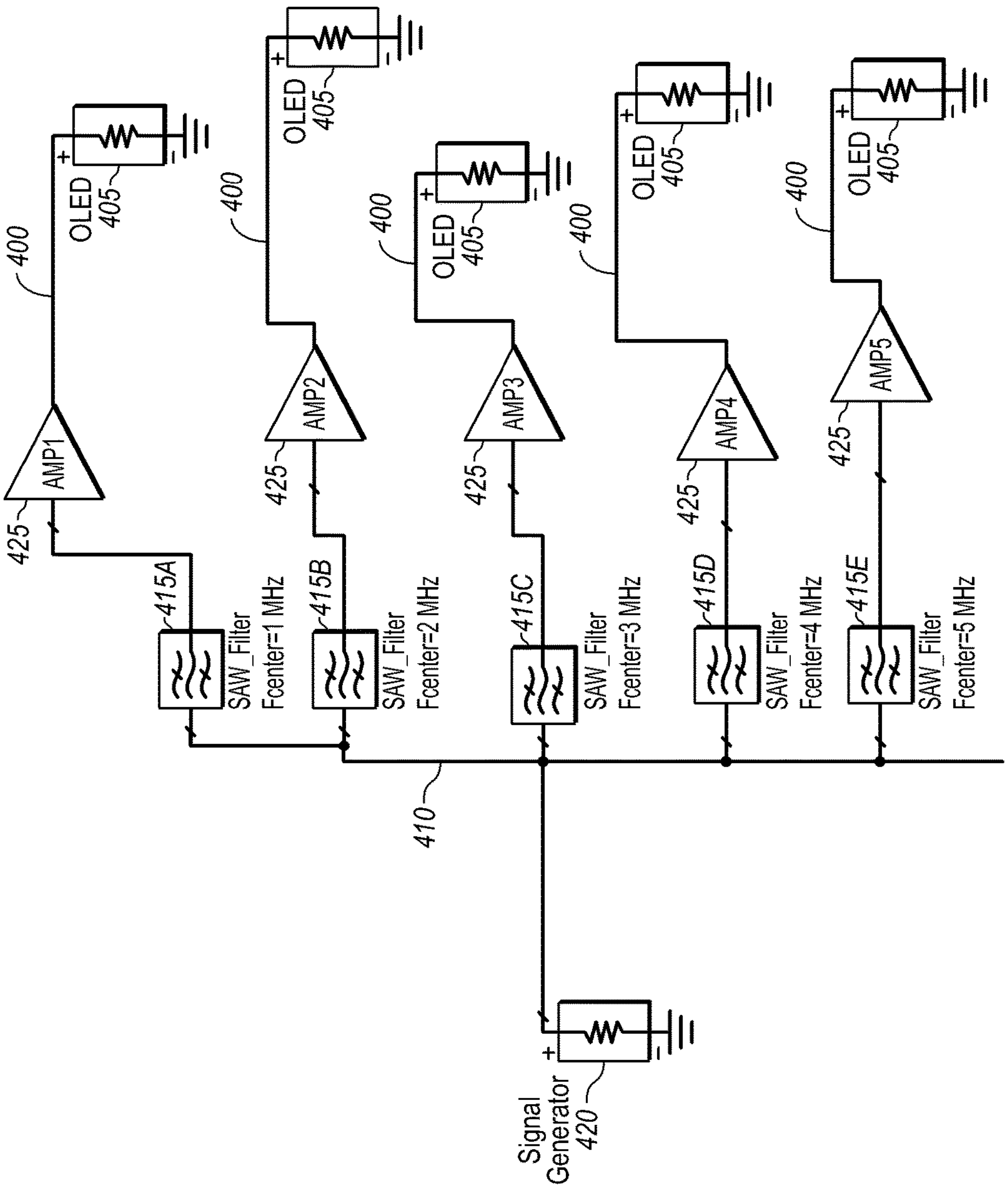
FIG. 4 illustrates a partial schematic of an example embodiment of the present invention.

Referring to FIG. 4, a partial schematic of an example embodiment of the present invention is illustrated. The embodiment illustrated in FIG. 4 includes a trace array 400 connected to a plurality of organic light emitting diodes (OLEDs) 405. The trace array 400 may be an X-axis or Y-axis trace array such as those shown in the previous embodiments, and may be supported by a substrate. A signal bus 410 is configured to conduct an alternating current of a wide range of frequencies to the trace array 400 as illustrated in FIG. 4. Each of the traces in array 400 is electrically coupled to a SAW filter 415A-E. Each of the subsequent SAW filters 415A-E in the series of SAW filters 415A-E is configured to conduct an alternating current transmitted at a gradually higher frequency. For example, the first SAW filter 415A is configured to conduct an alternating current transmitted at about 1 MHz, a second SAW filter 415B is configured to transmit an alternating current transmitted at about 2 MHz, a third SAW filter 415C is configured to transmit an alternating current transmitted at about 3 MHz, and so on, such that each of the trace arrays is configured to conduct current at a progressively higher frequency.

A signal generator 420 is electrically coupled to the bus 410. The controller 420 is configured to generate alternating current signals at different frequencies to the MEM SAWs 415A-E via the bus 410. According to the embodiment illustrated in FIG. 4, amplifiers 425 are also implemented for amplifying the selectively filtered signals transmitted to the trace array 400. Thus, the SAW filters 415 illustrated in FIG. 4 have tuned resonance to different frequencies which correspond to matching frequencies generated by the generator 420 as illustrated by the chart of the output filter band shown in FIG. 5.

Figure 6:
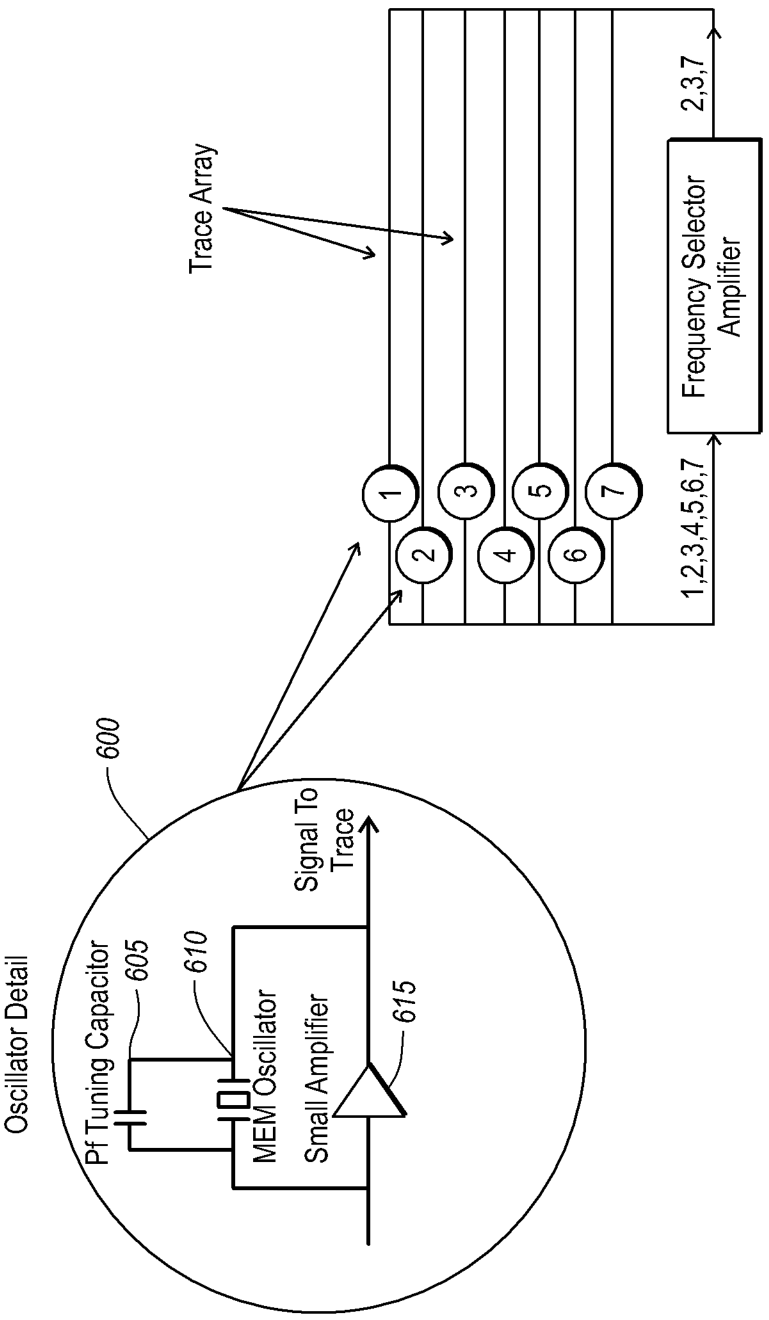
FIG. 6 illustrates another embodiment with particular detail to frequency selective oscillators.

Referring to FIG. 6, another embodiment is disclosed with particular detail to frequency selective oscillators 600. As shown, the oscillator 600 includes a Pf tuning capacitor 605 in parallel with a MEM oscillator 610 in parallel with an amplifier 615. Here, the oscillator 600 is frequency selected by the tuning capacitor 605. The tuning capacitor 605 is present to change the tuning frequency of the oscillator 600 and allows for a specific kind of MEM oscillator 610 that can be remotely tuned to a desired frequency.

Figure 7:
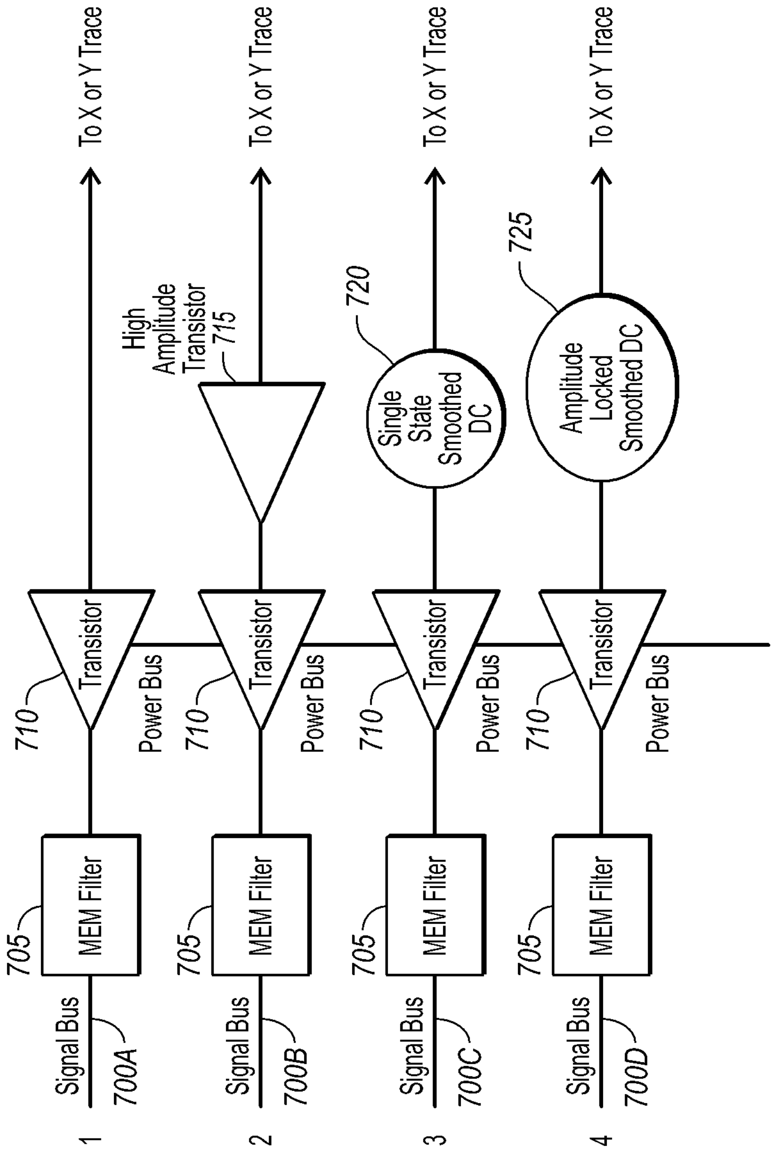
FIG. 7 illustrates an embodiment including different driver circuits for different display types.

Referring to FIG. 7, an embodiment illustrating different driver circuits for different display types is illustrated. Each signal bus 700 includes a resonant MEM Filter 705 and a transistor amplifier 710. However, the first trace 700A includes only the single amplifier 710. The second trace 700B includes a second higher amplitude transistor 715. Such stacking of transistors can be used for electro-florescence material, as such materials often need a higher voltage signal, for example at least as high as 80-110 volts. The first and second traces are designed for displays such as plasma displays that are not dependent on direct current.

The third trace 700C includes a single state smoothed DC rectifier 720 which has a fixed amplitude. The fourth trace 700D includes an amplitude locked DC rectifier 725 where amplitude information is allowed to come through the MEMs filter 705, but the amplitude is scaled to a controlled level. The third and fourth traces 700C and 700D with DC outputs are designed for use with OLED and polymer light emitting diode (PLED) embodiments, for example. Thus, different trace structures and driver circuits may be used depending on the type of display used.

Figure 8:
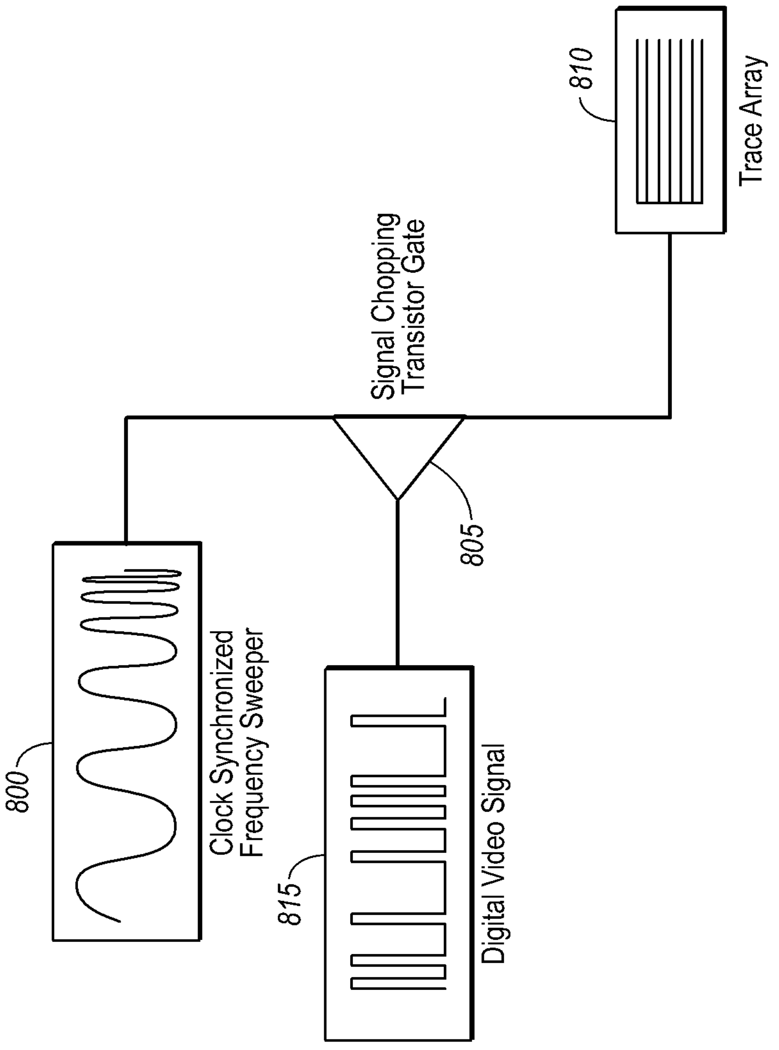
FIGS. 8-10 disclose driver circuits.
Figure 9:
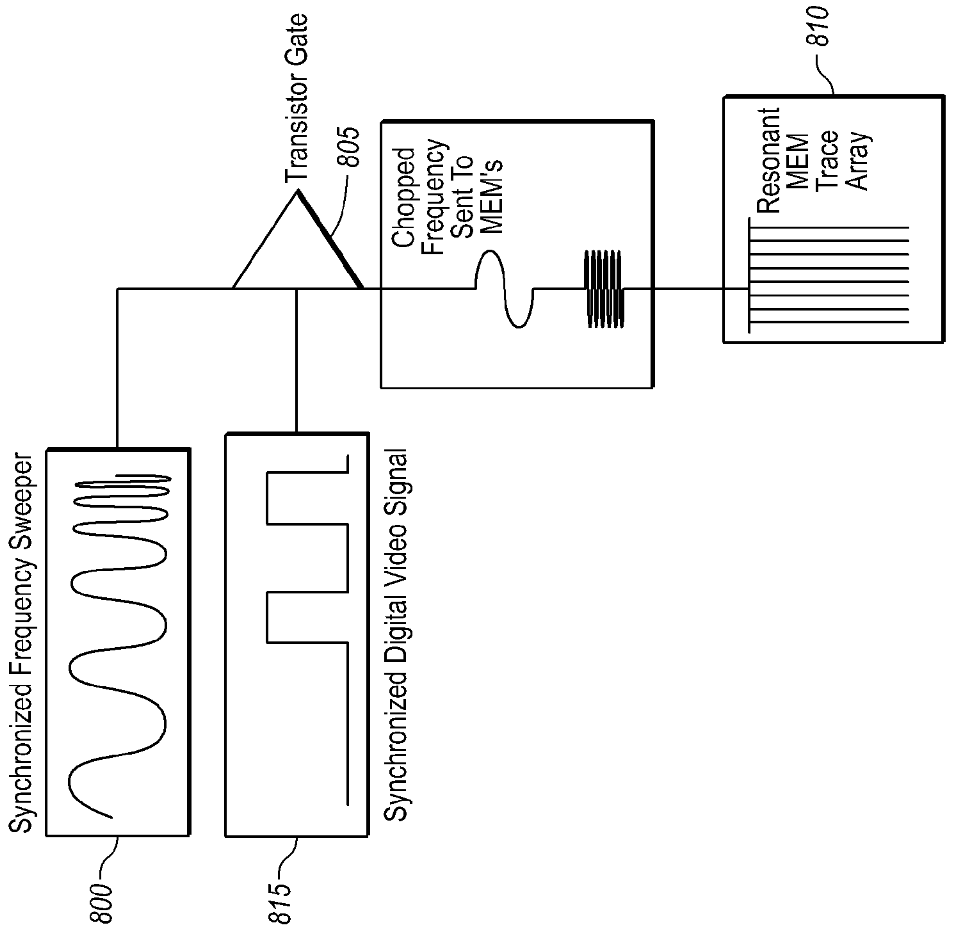
Figure 10:
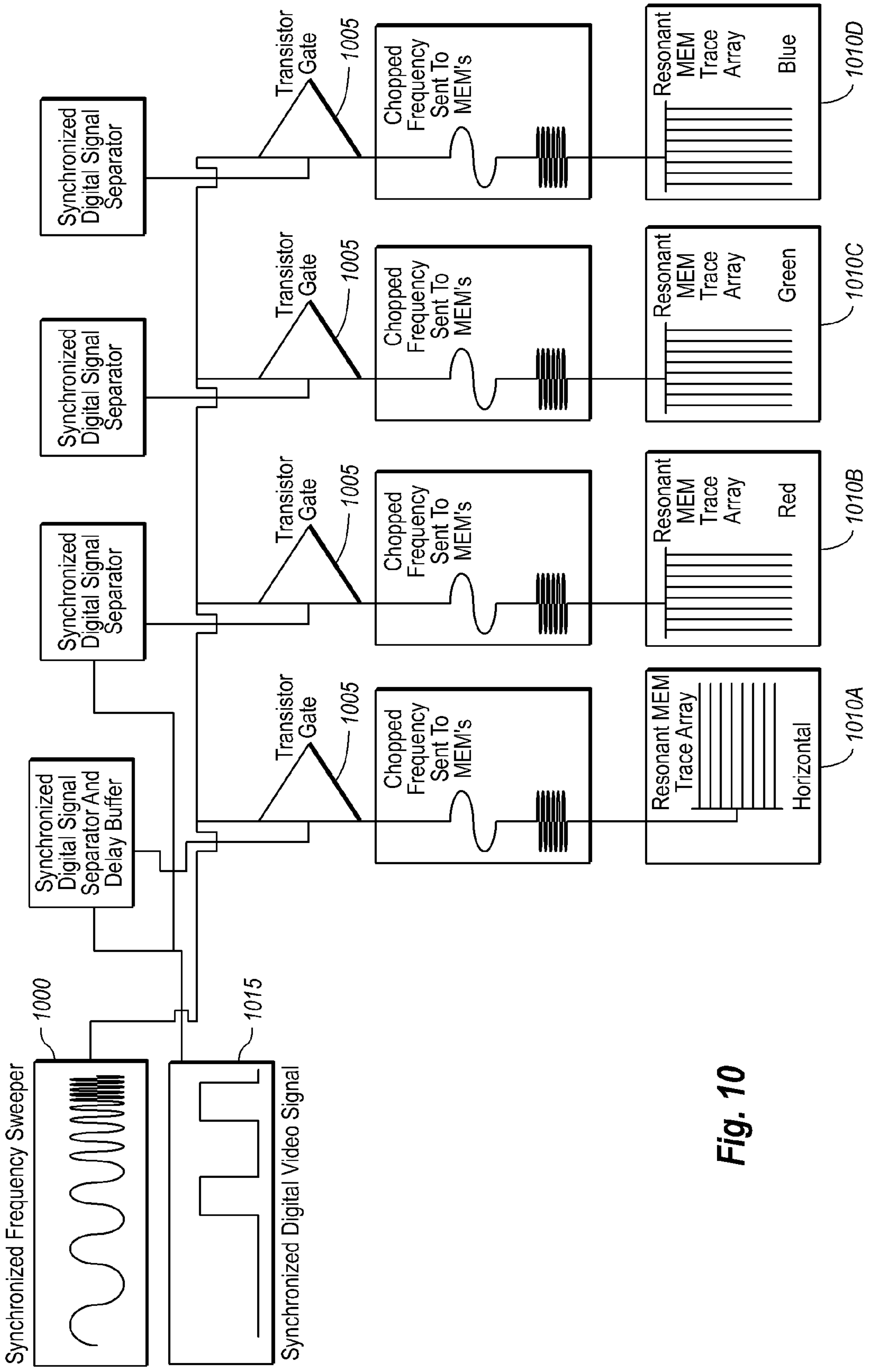
Figure 11B:
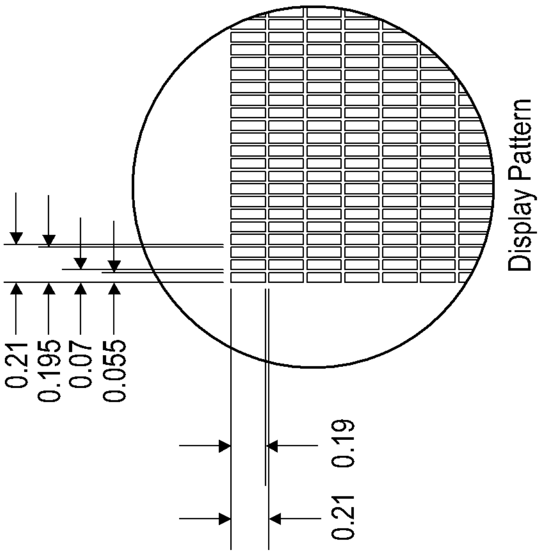
FIG. 11 discloses an example matrix design.
Figure 11A:
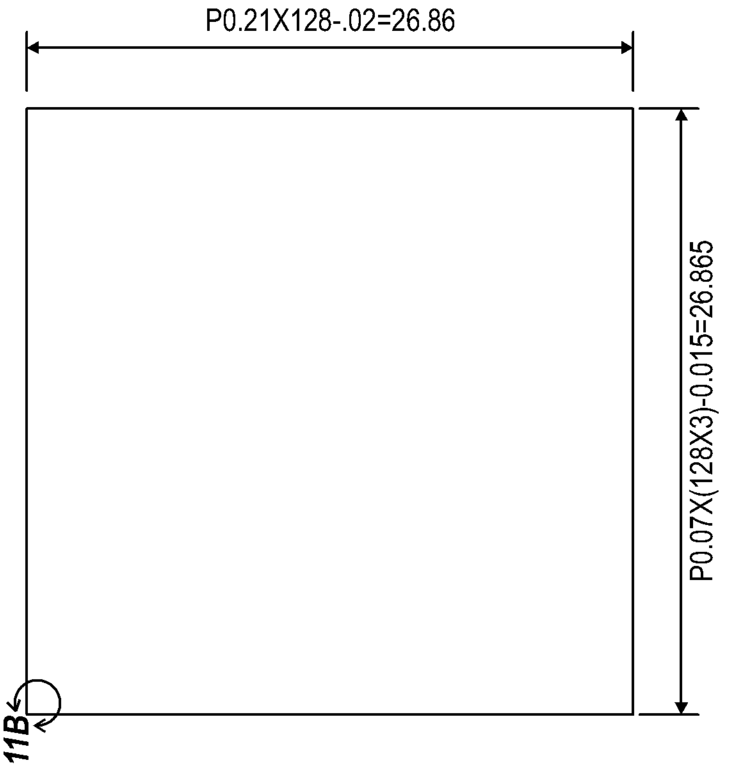

Referring to FIGS. 8-10, driver circuits (hereinafter also referred to as virtual active passive matrix drivers, or VAPM drivers) are illustrated. In FIGS. 8 and 9, the VAPM driver circuit includes a frequency sweeping signal generator 800 for generating a wide range of sweeping signal frequencies associated with each of the signal filters. The frequency sweeper 800 is synchronized with a clock rate of an otherwise synchronized digital sweep rate, which sweeps through a range of frequencies corresponding to the sequential resonance values of the MEM filters of a trace array 810.

In FIGS. 8 and 9, the driver circuit further includes a gate 805 for allowing a short portion, or chirp, of the frequency sweeping signal to be conducted through the gate 805 to the resonant MEM trace array 810. The gate 805 can be a signal-chopping transistor gate that is triggered to be open to various swept frequency bands depending on a signal received from a signal source 815, such as a DVD digital video signal.

The resonant MEMs of the trace array 810 have very high selectivity, high Q values, and fast response times. Fast enough, in fact, that most of the resonant MEMs may respond faster to their associated resonant first order harmonics than the transistors that amplify their response directly or in rectified DC mode. Time and amplitude values can be directly applied from the signals arriving from the signal chopping circuit to the transistor base which allows power into each individual trace. In this embodiment, the MEMs can replace the conventional boolean transistor processor network with a simple resonant responding gate array that is both extremely fast and energy-efficient.

Figure 19:
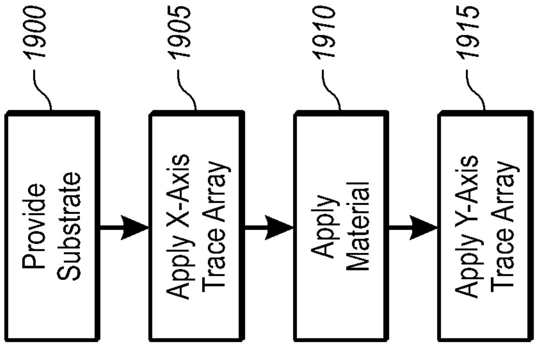
FIG. 19 is a flow diagram illustrating a method for manufacturing a display.

As shown in FIG. 10, a single signal generator 1000 can be configured to provide sweeping signals to multiple trace arrays 1010A-D, or multiple signal generators 1000 may be implemented and the sweeping signals, or chopped signals, may be multiplexed. In particular, one advantage is that currents of different frequencies can be simultaneously transmitted via the same electrical bus. Therefore, the ability to simultaneously address particular traces via multiple driving circuits offers an advantage over prior art methods. The driver circuit further includes a synchronized digital video signal that controls signals sent to the trace arrays 1010A-D in conjunction with a frequency chopping gates 1005. FIG. 19 illustrates a display pattern and an example of the scale of the trace array active area and pixel trace construction according to one example.

The driver circuits of FIGS. 8-10 offer additional advantages over conventional driver circuits. For example, Boolean processing rules determine the complexity associated with addressing high-density arrays. If we consider a high-density array of traces for a passive flat screen video display, and if the number of row traces is 1,200 the number of digital operations for defining each individual trace is 11. If the number of column traces is 1,600 the number of digital operations for defining each individual trace is also 11. If the refresh rate for the flat screen display is 60 Hz, then each trace must undergo digital operations 660 times and the entire screen must be supported with 1,267,200,000 digital addressing operations per second. Digital drivers for screens of this type exist, but let us consider the cost in energy of this type of driver:

1. Dwell time for each trace needs to be at least 50% in real time, so the clock speed of these digital operations actually may require 2,534,400,000 Hz so the trace gates can stay open or closed long enough for each frame to be illuminated with enough light.
2. Assuming the driver system is very efficient at 80%, the power needed for addressing operations on a high-density display of only 110 square inches may be as high as 30 watts.
3. When considering the extra power requirements of TFT's on an active display of this size, power consumption may be as high as 80 watts, just for switching millions of transistors on and off.
4. In addition to power efficiency, transistor architectures become increasingly complex with high-density digital drivers, often requiring secondary heat management such as heat sinks and fans, which also require power.

Use of MEM devices makes possible parametric resonant devices, which are highly frequency selective, efficient, and small enough to surpass transistors in a variety of applications. Several embodiments disclosed herein use resonant MEM filters on each trace of a display for the trace addressing application. Each MEM responds to a specific frequency and acts effectively as a band pass gate for each trace. A frequency for a particular trace will be sent through a central bus that the traces are connected to and a corresponding MEM allows a trigger voltage through for a dedicated transistor and/or rectifier circuit.

State of the art MEM's are so fast and efficient, that projected power usage for switching row and column arrays may be only 20% of current standards in some embodiments. Fewer transistor operations are needed for each trace, and unlike digital information, analog frequencies can, in some embodiments, be sent in multiples as high as twenty simultaneously, or higher. Some embodiments may be able to exceed by at least 2 orders of magnitude the speed from an equal number of resident transistor architecture in a digital processor. Sub diffraction limited Faraday cages on the display driver or conductive paint Faraday cages can also be included. The proposed frequency generator/sweeper can be routed either singly or in multiplexed design through the gate chopper that is activated by the digital video data stream. The chirped signals are then routed to the MEM arrays and converted there to trace activated power outs.

II. Additional Examples of Applications for Frequency Indexed Matrices

Many different embodiments are contemplated due to the wide range of applications of the resonant frequency matrix. Embodiments of the present invention include any device incorporating the resonant frequency matrix as well as the various embodiments for the resonant frequency matrix alone. Examples of the many embodiments that can incorporate the resonant frequency matrix include, but are not limited to displays, sensors, rapid prototyping devices, manufacturing devices, CCDs, digital cameras, telescopes, image recording devices, microscopy devices, memory chips, electronic papers, printing devices, heated pixel arrays, selective high density radio signal routing devices, touch screens, index tables, robotic tactile sensors, acoustical mapping devices, sound filtering devices, audio recording devices, amplification devices, sound wave direction sensors, sound source identification devices, motion detection devices, and integrated circuits. Other applications and matrix structures are described in the patent applications listed at the beginning of this specification to which this application claims priority to.

In addition to resolution and size flexibility, the malleable properties of the material comprising the matrix layers itself may in fact generate matrices that are functional in a variety of two-dimensional and three-dimensional shapes and configurations according to both active and reactive embodiments. The RF-matrices can be sculpted or molded to complex curves, or shaped for projection onto topographically non-uniform surfaces to create a correct reading image. An example of this includes, but is not limited to, a display surface that is curved or can be formed to take on virtually any shape such as around a column, or a sphere. This shape variation may be limited to the degree that the conductive materials and the base surface are of equal degrees of plasticity, elasticity, or other property, to provide for a topographically non-uniform surface without loss of functionality.

A. Examples of Displays Incorporating the Resonant Frequency Matrix

Several embodiments disclosed herein exemplify how the resonant frequency matrix (resonant frequency matrix) can be used to power any of the current and future technologies for displays. The simplicity of the function and manufacturing for the resonant frequency matrix make such embodiments a suitable, effective and efficient alternative that can reduce cost and energy usage as compared to conventional display designs. The use of Alternating Current (AC) over the Cartesian-style matrix creates an elegant low-profile activation grid, generating pixels over a broad range of light emitting materials and methods.

Since integrated circuitry dedicated to each pixel is not needed to activate each pixel, the complexity of circuitry is greatly reduced in the resonant frequency matrix. Therefore, the thickness of finished display embodiments can be reduced to a fraction of that generated by traditional display manufacturing methods. In several resonant frequency matrix embodiments, the thickness of the preprinted substrates with the X- and Y-traces, the sandwiched activation material, and any filtering layers or materials used as aperture and colorants for the light emitted at each X- and Y-intersection point comprise the profile of the display. The translation and conversion of the video signal to the appropriate bandwidths to activate the specific Cartesian coordinates of selected pixels in each of the RGB colors create the display image using the resonant frequency matrix. Video signals can be received from any source using any current or future interface used for displays or other links for communicating video signals.

These methods of creating and powering high-resolution displays can in some embodiments enable the creation of ultra-thin screen technology, thinner than current display methods due at least in part to the elimination of per pixel circuitry. The resonant frequency matrix activation circuitry can be manufactured at a fraction of the cost of current technology. Aesthetically, functionally, and economically superior technology generates a versatile method of powering all manner of display devices, such as but not limited to, electroluminescent displays, plasma displays, LED displays, OLED displays, EFE displays, LCD, cholesteric displays, electrophoretic displays, and electrochromic displays.

Where the material is electro-luminescent or plasma, the activation of the material creates an activated pixel of light at the intersection. The material can be in solid, liquid, or gas state or any combination of solid, liquid and gaseous material. In this embodiment, scanning intersections of pixels over the matrix at rapid speed creates a display addressed by the resonant frequency matrix unit. The resonant frequency matrix can be connected to a tuning chip, which translates incoming data from a television receiver or a computer into images displayed by the resonant frequency matrix.

The addition of a visually transparent mask layer upon which has been printed a visually opaque black mask in visually opaque ink in a grid pattern that corresponds with the Cartesian coordinates of the intersection of X- and Y-axis, can delineate the burst of light into a pixel-like shape with cleaner edges, thereby generating a screen dot or other shape, or point of light, which works together with the others to create the moving images in an orderly fashion wherein the light from one pixel does not unduly cloud or diffuse the next. This mask creates the screen or filter definition for each pixel printed at the appropriate resolution to match the grid of the matrix. Utilization of directional light conducting materials can perform a similar function.

In addition to the outer edge pixel masking dyes in red, green and blue can be used within the transparent areas to create the red, green and blue pixels that comprise the screen images. According to a resonant frequency matrix display embodiment, the same dye treatment can be applied when selected as an appropriate option for RGB images. Image information is received and translated according to the application. Selected grid patterns are produced by customized resonant frequency generation to activate pixels which generate the appropriate RGB image.

A plurality of similar color activations can be used in this invention depending on the application. For example, inks, e-inks, cyan, magenta, yellow and black color separation technology, selected premixed ink or dye colors, selected premixed ink or dye colors in metallic, iridescent, pearlescent, microencapsulated materials (E-ink, Gyricon, NTerra, Sipix), electrophoretic, choloresteric, electrochromic, electrowetting, liquid crystal, or other varied finishes or materials can be used.

In addition to resolution and size flexibility, the malleable properties of the material comprising the matrix layers itself can generate matrices which are functional in a variety of three-dimensional shapes. An example of this includes, but is not limited to, a display surface that is curved or can be formed to take on virtually any shape such as around a column, on a sphere, sculpted or molded to complex curves, or shaped for projection onto topographically non-uniform surfaces and can be configured to compensate and create a correct reading image. This shape variation may be possible only to the degree that the conductive materials and the base surface are of equal degrees of plasticity, elasticity, or other property, to provide for a topographically non-uniform surface without loss of functionality. In addition, construction of the resonant frequency matrix in transparent materials with appropriate color masking can generate a two-sided transparent display.

RF Matrices can also be utilized to create displays that are viewable from both front and back. For Example, the X and Y traces can all be created in the transparent conductive material separated by the electro-luminescent layer and masked with appropriate pixel masking film on both sides of the display.

The resonant frequency matrix in either configuration or combination thereof can be used to address all manner of current display technology. For example, the resonant frequency matrix can be used to address pixels in any of the example embodiments discussed hereinafter:

1. Displays Incorporating a Carbon Nanotube Material

According to another embodiment, carbon nanotubes can be grown vertically on a Z-axis display layer connecting X and Y intersections. These intersections can have emissive phosphor terminations enabling them to emit light also. Thus, three dimensional displays can be created by such embodiments.

Figure 12:
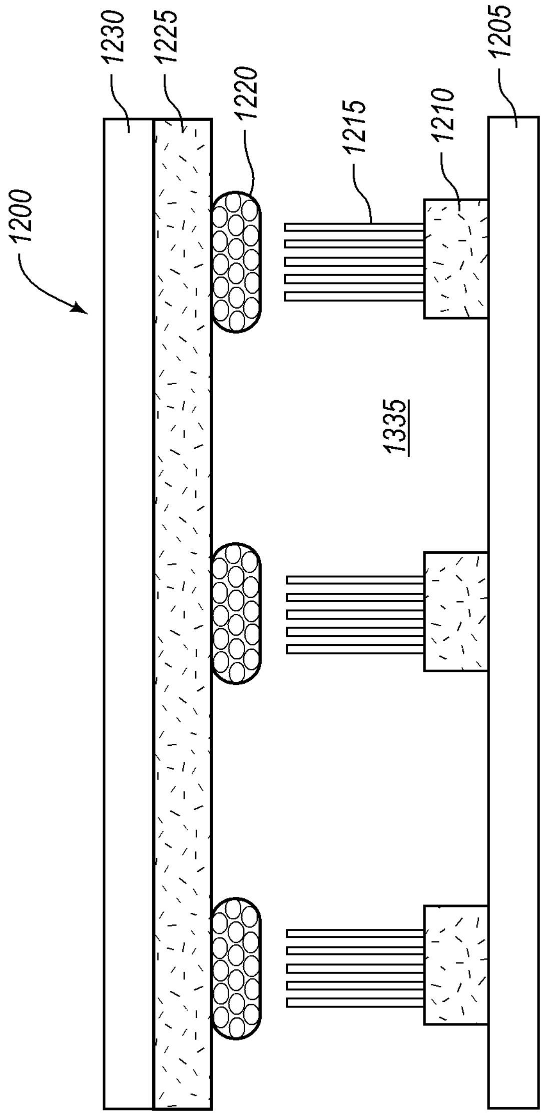
FIG. 12 illustrates a resonant frequency matrix.

For example, referring to FIG. 12, the resonant frequency matrix is illustrated according to an example embodiment for use with carbon nanotubes grown by CVD or other process known in the art for the purpose of selective electron emission. Electrons excite specifically applied phosphors and cause them to emit light at specific intersection points of X- and Y-axes. The Cartesian intersection points can be used to selectively activate phosphors. This embodiment can be created as a sealed vacuum construct as described hereinafter.

An X-axis trace array 1210 is produced on a non-conductive insulating substrate 1210. The use of an X- and Y-axis is used for illustrative purposes only and is not to be considered as limiting the scope of the present invention. The non-conductive substrate 1210 supports the circuit components and can be at least partially made of materials such as glass, plastic, or ceramic. A first signal bus is produced on the substrate 1210, (e.g. see illustration FIG. 1A-C or 2A-C). The first signal bus is configured to conduct alternating current of a wide range of frequencies to the X-axis trace array 1210. Each of the traces 1210 is electrically coupled to a frequency selective filter (e.g. see illustration FIG. 1A, 1B, 1C or 2A, 2B, 2C). The filters can include, for example, capacitors and/or inductors that are configured to filter electrical signals of different graduated frequencies. Thus, each of the subsequent filters in the array 1210 can be configured to conduct an alternating current transmitted at a gradually higher (or lower) frequency. An X-axis controller (e.g. see illustration FIG. 1A-C or 2A-C) is electrically coupled to the bus and is configured to generate alternating current signals at different frequencies to the filters via the bus. It should be appreciated that the controller can be located on the same substrate 1210 as the resulting resonant frequency matrix or a separate substrate than the resonant frequency matrix with electrical connections for providing the alternating current to the bus.

A carbon nanotube material 1215 is produced over the X-axis trace array 1210, e.g. using CVD or another method. An insulating substrate 1230 is produced with Y-axis traces 1225 (e.g. in the same manner illustrated in FIG. 1A-C or 2A-C). Next, selectively applied dots of phosphor 1220 are produced at discrete points, such as in a patterned sequence on top of the Y-axis traces, on top of the of the insulating carrier substrate 1230, and/or may be a combination of selectively applied phosphor materials with different properties applied thereupon. The phosphor material may be applied at discrete points (or "islands" of material) as in a patterned sequence using various luminous materials with different properties, such materials whose density create varied levels of spectral reaction or color. Each island deposit of material can correspond to a pixel of a certain value. For example, each deposit of phosphor material can correspond to a pixel of a certain value required for excitation of phosphor material to be activated.

When current is generated at the selected Cartesian X- and Y-axis intersection point, the carbon nanotubes 1215 emit electrons which, in the vacuum space, excite the phosphor 1220 printed directly above, and cause the phosphor 1220 to emit light for display purposes. In one embodiment, various color phosphors such as those found in red, green and blue dots of a display can be selectively applied and activated to create color images.

2. Electroluminescent Displays

According to an example embodiment, the material is an electro-luminescent layer, which responds to an alternating current signal where X and Y traces cross with resonant gains by changing a spectral property and inducing a photon emission from a change in electronic energy states thereby producing a luminance. Greater brilliance by electro-luminescent material with less energy can be achieved because a greater emission angle from emitted light pixels is possible with this method since the emission source can be placed much closer to the visual surface of the display, where previous layers of masks caused diffractive interference and shadows in other types of displays.

Figure 13:
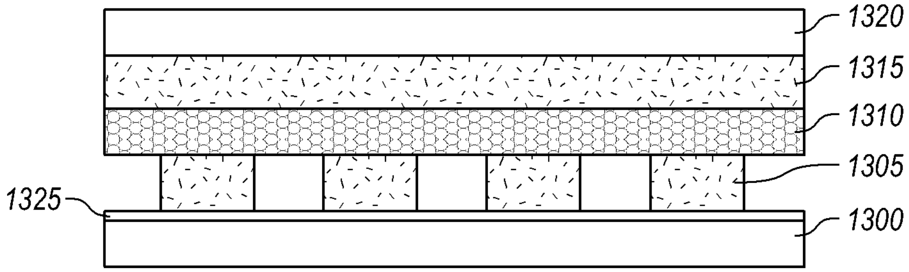
FIG. 13 illustrates an electroluminescent display embodiment.

As is illustrated in FIG. 13, an efficient method of creating a display with the resonant frequency matrix is the Electroluminescent Display. Electroluminescent embodiments are often less expensive to manufacture where the materials are less expensive and the ease of manufacturing is greater for fabrication. In addition, such embodiments utilize a minimum of materials for the greatest resolution and brilliance and may have the thinnest profile. There is availability of multiple means of producing and powering the electroluminescent material and circuitry.

Figure 5:
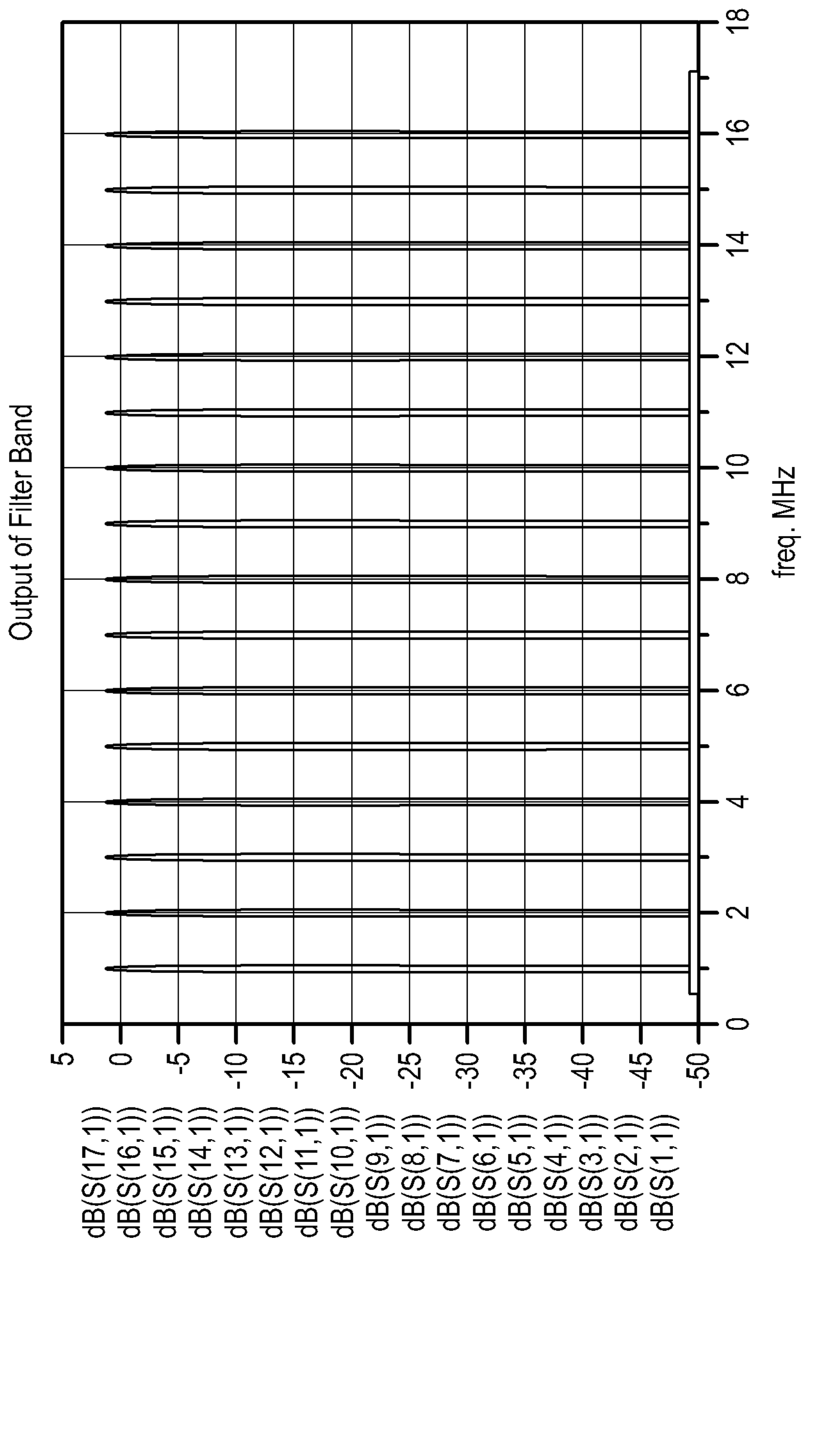
FIG. 5 illustrates a chart of an output filter band.

In the cross-section illustrated in FIG. 5, the following construct is demonstrated: A base substrate layer 1300 is produced with metal conductive traces 1305 as the base of the Cartesian resonant frequency matrix circuitry. Directly atop this trace layer is an electroluminescent phosphor material 1310. Atop the electroluminescent phosphor material 1310, a second row of traces 1315 that can be produced in a transparent conductive polymer on a carrier substrate 1320.

Change of electron population in electroluminescent phosphors by means of a high voltage alternating current electromagnetic signal creates a leaking capacitor that leaks light. It causes charge inversion that emits light from the electroluminescent phosphor material 1310. When the alternating current passes through the selective X- and Y-traces 1305 and 1315 of the resonant frequency matrix shown in FIG. 5, the intersecting points will have a localized charge buildup in a capacitive framework. Some of the charge buildup excites the phosphor electrons of the sandwiched electroluminescent phosphor material 1310 into a higher energy state that subsequently collapses into a lower energy state, the difference in energy being carried away by a visible photon.

The electroluminescent phosphor material 1310 is a part of the same family as UV-excited glow in the dark phosphors. Many of the preferred electroluminescent phosphors have a delayed emission that is visible upon UV excitation. The specific points of emission can be used to create color displays in various methods. A first method includes producing a black mask or bank as is used in conventional display manufacturing methods, with the sandwiched electroluminescent phosphor material 1310 preprinted in an RGB pattern using colored phosphors.

These individual points of light-emitting material can then be subsequently activated by the appropriate current passing between the X- and Y-traces, based on the pre-translated RF signals over time to create moving color images. Colored phosphors can eliminate the need for a fourth transparent color masking layer as is currently used in the display industry. This is another advantage since filters such as overlays reduce the amount of visible light and thus the resonant frequency matrix electroluminescent display generates more visible light. As a result, the colored phosphor method is a more efficient, brilliant and energy saving method. The electroluminescent phosphor material 1310 can be printed at high resolution using any common printing method, such as silkscreen, flexography, offset lithography, pad printing, gravure, deposition and laser ablation, ink jet, thermography, Chemical Vapor Deposition (CVD), and/or vapor deposition.

The specific pattern of RGB printed onto the electroluminescent phosphor material can be at the discretion of the manufacturer. However, line resolution up to 1000 dots per inch and greater can be achieved, generating a far finer display than possible with conventional displays, generally also with greater brilliance. Traditional manufacturing methods can also be used with one white electroluminescent phosphor material 1310 sandwiched between the X- and Y-traces with a fourth layer transparent color mask overlaying this with a black separation between the pixel areas or a separate black bank mask for pixel delineation and clarity. The resonant frequency matrix can simply eliminate the massive integrated circuit row and column architectures of conventional trace matrices in virtually any type of display.

Figure 3B:
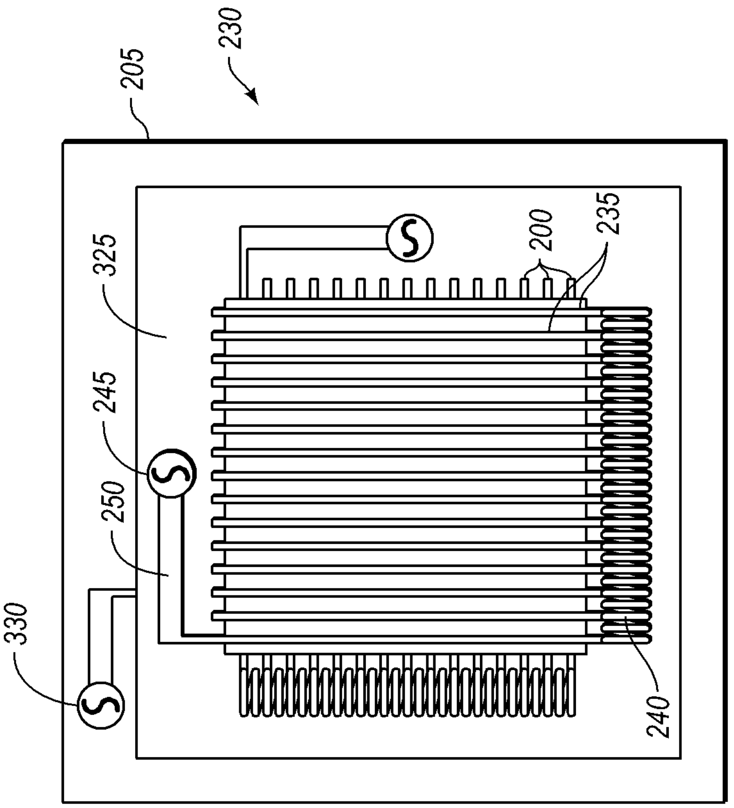
FIG. 3B illustrates a resonant frequency matrix including a photoconductive material according to an example embodiment.

The electroluminescent display may include means for extending the response of the electroluminescent phosphor material 1310 to a stimulus as disclosed in further detail above with regard to FIG. 3B. For example, the response of the electroluminescent phosphor material 1310 to a stimulus received from the X- and Y-traces 1305 and 1315 may extend the duration of illumination of the electroluminescent phosphor material 1310 in response to a current conducted by the X- and Y-traces 1305 and 1315. Implementation of means for extending the response of the electroluminescent phosphor material may be included as a layer 1325 of photoconductive material between the substrate 1300 and the X-axis traces 1305. A voltage source is coupled to the photoconductive material 1325 such that when the material 1310 is illuminated, the current carrying ability of the photoconductive layer 1325 is enhanced at that location. Thus, the photoconductive layer 1325 enables a pixel to remain in the "on" state longer as a result of the voltage carried thereby.

3. Plasma Displays

Figure 14:
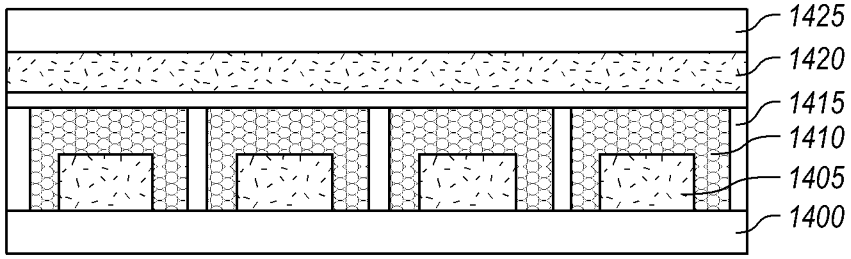
FIG. 14 illustrates a plasma display embodiment.

The resonant frequency matrix is an excellent method of addressing power in a plasma display as illustrated in FIG. 14. FIG. 14 illustrates a plasma display cross-section, wherein pixels are created with high voltage light emission via gaseous corona discharges. In this cross-section, the following construct is demonstrated: A base substrate layer 1400 is produced with metal conductive traces 1405 as the base of the Cartesian resonant frequency matrix circuitry. Trace cells 1410 of corona emitting gas are aligned by cell walls 1415. Atop the layer of cells 1410 is a second row of traces 1420, which can be produced in a transparent conductive polymer on a carrier substrate 1425.

The resonant frequency matrix can be used in a plasma display where the Cartesian intersections of voltage differential in the resonant frequency matrix excite the isolated sealed gas cells 1410 which are positioned at these intersections. Examples of gases captured in the sealed cells include neon, argon, xenon, and any other gaseous material commonly used in plasma screens. A corona discharge creates an emission of light when the outer electrons get stripped off of these gas molecules. Traditionally, the corona is activated with a higher voltage than the LED display, for example, and it can be AC or DC.

The resonant frequency matrix is used to activate these cells and the corona discharge and plasma functionality are maintained. However, these points are activated in a manner without the conventional circuitry previously required to enable each pixel to emit the corona. Plasma emission is a relatively power-efficient method and combined with the resonant frequency matrix Cartesian method of pixel activation, generates a visually excellent embodiment with manufacturing cost benefits for the production of the circuitry. Traditional expense and labor intensiveness of the gas cells isolation in manufacturing is not affected by the application of the resonant frequency matrix to a plasma display however its overall cost is reduced in that no integrated circuitry may be necessary.

4. LED and OLED Displays

Figure 15:
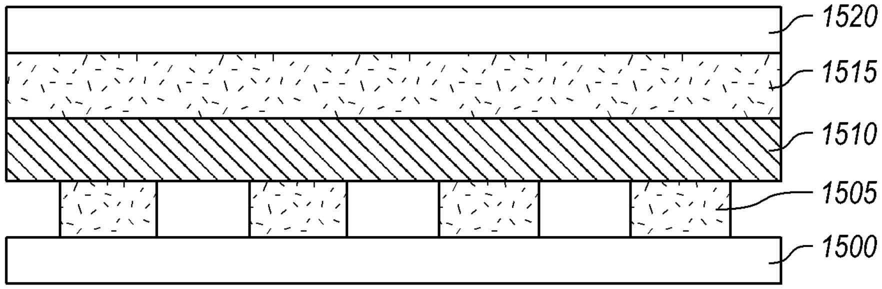
FIG. 15 illustrates a cross-section of light emitting diode (LED) and organic light emitting diode (OLED) display embodiments.

Referring to FIG. 15, an LED or OLED cross-section demonstrates the construction of these embodiments. In this cross-section, the following construct is demonstrated: A base substrate layer 1500 is produced with metal conductive traces 1505 as the base of the Cartesian resonant frequency matrix circuitry. Atop these traces is a layer either NP or PN LED or OLED material 1510. Atop the LED or OLED layer 1510 is the second row of traces 1515 which can be produced in a transparent conductive polymer on a carrier substrate 1520.

The resonant frequency matrix is an excellent method of addressing power in an LED or OLED display wherein light emission occurs via charge inversion recombination between electron or hole donors and, generally requires a DC bias. In current applications, diodes have a voltage bias because semiconductive materials require that a threshold voltage be exceeded before the conduction band becomes operative.

The resonant frequency matrix activates the LED or OLED material 1510 by electron hole recombination between a polarized junction created by the X-Y trace Cartesian intersection thereby causing photonic light emission. In accessing power to a DC-biased device, the resonant frequency matrix, utilizing AC power, cannot carry the signal on the entire wave form in that only half of the signal will be transmitted. Since the duration of half the signal waveform is half of the DC duration of pixel emission, the resonant frequency matrix method of accessing pixels, a compensatory mechanism, can be used to reapply the emission for the half of the waveform that does not transmit. Methods to compensate include a preferred method of lengthening average duration signal times or a thickening of the LED or OLED diode material 1510.

5. Tandem LED and Tandem OLED Displays

Figure 16:
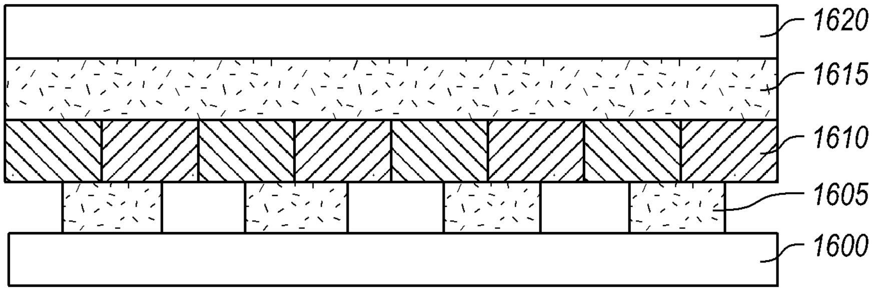
FIG. 16 illustrates a cross-section of Tandem LED and Tandem OLED display embodiments.

FIG. 16 illustrates a Tandem LED or Tandem OLED cross-section, which is a viable method of compensating for the half waveform signal transmission in DC biased devices. This compensatory method creates tandem LEDs or OLEDs with opposite polarity thereby utilizing the full wave form, wherein split pixels can be created. This method can be used to compensate for the half waveform utilization without modifying the LED or OLED materials or adjusting average duration.

In this cross-section, the following construct is demonstrated: A base substrate layer 1600 can be produced with metal conductive traces 1605 as the base of the Cartesian resonant frequency matrix circuitry. Atop these traces is a layer of tandem NP and PN LED or OLED material 1610 which is split atop each of the traces and the signal is caught by either side of the material. Atop the tandem LED or OLED layer is a second row of traces 1615 that can be produced in a transparent conductive polymer on a carrier substrate 1620.

The resonant frequency matrix in its intersection points along the Cartesian pattern create serial pixel activation of the LED or OLED material 1610 sandwiched between the X- and Y-layer traces 1605 and 1615. With an appropriate compensatory method an advantage is that lower voltages can be utilized, and the extremely thin profile of the resonant frequency matrix will be effected. The same method applies to OLED displays, a new partner to LEDs in an organic version.

6. EFE Displays

Figure 17:
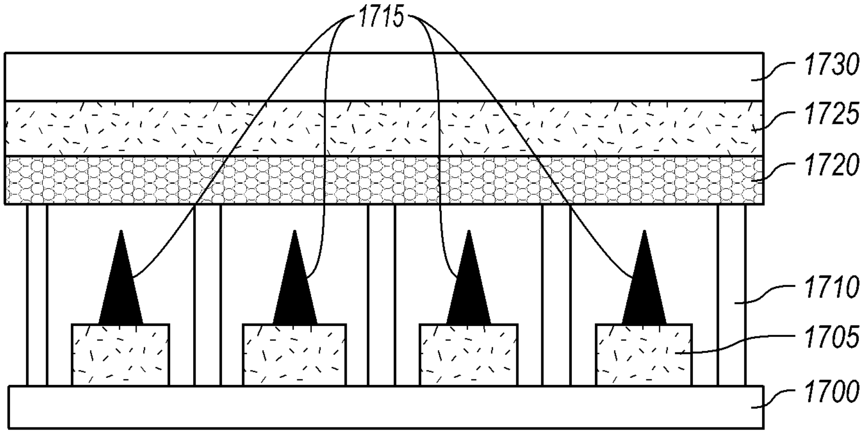
FIG. 17 illustrates a cross-section of Electron Field Emission (EFE) display embodiments.

The resonant frequency matrix is an excellent method of addressing power in an Electron Field Emission display, wherein light is emitted from electrically excited micro-cathodes. FIG. 17 illustrates the construction of an example embodiment. In the cross-section illustrated, the following construct is demonstrated: A base substrate layer 1700 is produced with metal conductive traces 1705 as the base of the Cartesian resonant frequency matrix circuitry. Between these traces is a porous support structure 1710, and on top of each of these traces connected thereto is a pointed electron field emitter 1715, all of which are in a vacuum. Atop the support structure and not touching the traces 1705 or electron field emitters 1715 is a layer of phosphor material 1720. Atop the phosphor material 1720 is a second row of traces 1725 produced in a transparent conductive polymer on a carrier substrate 1730.

Currently EFE is primarily used for CRT displays. However newly developed micro-cathode arrays impinging on localized phosphors are currently being developed. Carbon nanotubes can also be used for this technology to a greater efficiency.

The resonant frequency matrix used in the EFE application is similar in nature to the LED which implies a field bias with light exiting at one end. However, this is a proven method simple in fabrication. Localized Z-axis vertical nanotubes, cones, or point source perpendicular to the underlying electrode can be used. When the voltage reaches a critical peak value, electrons fountain off the point, collapse the field around the point of the vertical structure and race away from the point carrying an electric current of electrons in the opposite direction. The electrons collide against or impinge upon an overlaying phosphor material 1720 sandwiched in between the X- and Y-axis traces 1705 and 1725 in a vacuum. The phosphor material 1720 is excited to a higher energy state causing light emission. The resonant frequency matrix provides the addressing power at the intersection of the X- and Y-axes traces 1705 and 1725, generating a pixel with the vertical conductor between X- and Y-axes traces at the intersection point and the overlay of phosphor material 1720 is the first surface the electron hits to be activated within the vacuum of the resonant frequency matrix EFE display construct. The light passes though the transparent conductive overlapping trace layer 1725; and in an array creates selectively addressable display pixels. This array can then be color filtered to create RGB images with a black mask, as is currently done in the art. Thus, the need for individual circuits to each pixel has been obviated with the resonant frequency matrix hence the efficiency and method of manufacture has been enhanced by the simplicity of the resonant frequency matrix pixel activation method.

In accessing power to this DC-biased device, the resonant frequency matrix, utilizing AC power, may not carry the signal on the entire wave form, in that only half of the signal will be transmitted. Since the duration of half the signal waveform is half of the DC duration of pixel emission, the resonant frequency matrix method of accessing pixels may require a compensatory mechanism to replace the emission for the half of the waveform that does not transmit. Examples of methods to compensate include the preferred method of lengthening average signal duration through rapid signal repetition, compensating for the half waveform signal transmission without modifying the EFE materials.

The resonant frequency matrix in its intersection points along the Cartesian pattern creates serial pixel activation of the EFE material 1720 sandwiched between the X- and Y-layer traces 1705 and 1725. With an appropriate compensatory method, an advantage is ease of manufacturing, and the extremely thin profile of the resonant frequency matrix.

7. LCD Displays

Figure 18:
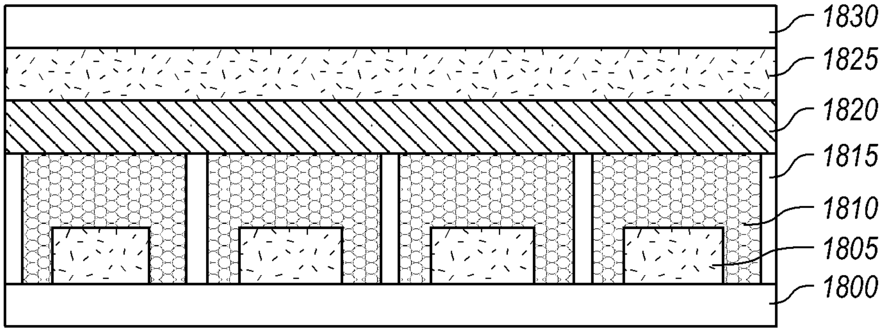
FIG. 18 illustrates a cross-section of LCD display embodiments.

FIG. 18 illustrates an LCD cross-section of the construct for this embodiment. The resonant frequency matrix is an excellent method of addressing power in an LCD, wherein a display primarily operates by field polarization on arrays of linearly aligned molecules of a light polarizing material. These molecules function as switches that act as light gates, structurally similar to a Venetian blind in that they do not actually emit light but allow light to pass through, activated by DC current.

In the cross-section illustrated in FIG. 18, the following construct is demonstrated: A base substrate layer 1800 is produced with metal conductive traces 1805 as the base of the Cartesian resonant frequency matrix circuitry. Between these traces, sealed walled cells 1815 of liquid crystal material 1815 is an NP or PN diode layer 1820, which is directly above the liquid crystal cell layer 1815. Atop the cell layer is a second row of traces 1825 produced in a transparent conductive polymer on a carrier substrate 1830.

The resonant frequency matrix can be used in the LCD display as follows: LCDs are activated by DC bias aligning liquid crystal molecules 1815 in a manner that allows polarized light to escape through them. An alternating field from the resonant trace structure of the resonant frequency matrix may require localized rectification from a diode structure which is more complicated than current structure but feasible in a production scenario.

The gaps between the X- and Y-traces 1805 and 1825 in the resonant frequency matrix intersection points contain diode mediated parallel molecular or microscopically embedded structures that are perpendicular to the electric fields of a beam of polarized photons. When the structures are perpendicular to the fields, the embedded structures transmit. When the structures are parallel to the fields, they absorb. Thus a polarization light switch is created, wherein current at the X- and Y-axis traces 1805 and 1825 intersects to turn the polarization on and off. Because an alternating signal would make the LCD crystal line up and dealign rapidly, a particularly efficient embodiment can have accompanying rectification structures such as a diode rectifier.

A dual diode method for full wave rectification can be constructed with two diodes within the sandwich layers. Atop the traces on the first layer is a diode layer, above the diode layer is a substrate with LCD material, and above the diode layers is another substrate with the second diode on top of that, and finally the top trace is on its carrier film that can be transparent. A preferred embodiment can utilize a single diode for half-wave rectification, which allows for simplified manufacturing, combined with compensatory average duration repetition adjustments. The recovery time for the liquid crystal material 1815 is of sufficient duration to use a half wave rectified circuit for most applications. Tandem circuits can also be created with two diodes at opposite polarizations on the same trace. The light source is selectively permitted to pass through as the pixel is activated by the current generated at the intersection of traces of the resonant frequency matrix creating the conversion to DC voltage required for each pixel. This array can then be color filtered to create RGB images with a black mask, as is currently done in the art.

The invention disclosed herein exponentially reduces the need for individual row and column drivers for the activation of a matrix driving constructs such as flat panel displays. In contrast to the relatively limiting and costly complex row and column constructs presently used in the industry, several of the embodiments illustrated herein are able to generate a nearly paper-thin and high resolution replacement consisting of a resonant frequency-activated Cartesian array of multiple circuit elements, which, with appropriate shielding and activation, results in rapid intersection power transmissions at resolutions ranging from 1 to 2000 lines per inch or more (depending on the structure of the array and subsequent signaling patterns) with such resolutions being limited only by material and manufacturing processes.

Where X coordinate traces and Y coordinate traces share a common signal bus with terminal resonant structures such as inductive and/or capacitive filters, pixels can be discretely addressed by alternating resonant radio signals from a centralized frequency generator sweeping through several frequency bands. Because alternating electrical signals will trigger electroluminescent and plasma display cells directly, the need for additional LCD complexity can be eliminated.

In addition to simplification of circuitry, greater brilliance with less energy can be derived in that a greater emission angle from emitted light pixels is possible with this method since the emission source can be placed much closer to the visual surface of the display, where previous layers of masks caused diffractive interference and shadows in other types of displays.

This technology can easily be adapted to several lithographic production scenarios. In addition to transparent conductors such as tin oxide, indium tin oxide, cadmium stannate and zinc oxyflouride, a new class of organic plastic transparent conductors such as poly(3,4-ethylenedioxythiophene) (PEDOT) materials. PEDOT can be crosslinked from the monomer form or used in a waterborne dispersion that forms a clear conductive film when dried and is a suitable economic alternative to the sputtering of ITO and other inorganic coatings. Transparent carbon nanotube film is a new class of conductive transparent material well-suited for this application.

A method of constructing a resonant frequency matrix for use in a display includes using a non-conductive base material first established at a preferred size appropriate for a particular application, in an insulated material such as, but not limited to, glass or ceramic. Upon this non-conductive base material is printed or applied a pattern of X-axis traces at the desired resolution or lines per inch with a pattern compatible with a selected capacitor or inductor.

This trace pattern is printed in a conductive medium, or a film of conductive material, and subsequent to its curing, a pattern is ablated from such conductive material, to create a pattern of X-axis traces of conductive material, such as, but not limited to, electro conductive polymer, PEDOT, or conductive transparent metals such as indium tin oxide or others that are common in the art, opaque metals or other conductive material. Or a preconstructed film of conductive carbon nanotube can be utilized as well. This material can be either transparent or opaque as required in the assembly of materials. Methods of application of this conductive material include, but are not limited to, flexo, gravure, offset printing, (subtractive) laser-ablation, silkscreen, chemical vapor deposition, vacuum sputtering, photolithography, electroforming, inkjet, or other circuit pre-made and affixed by means of adhesive or other methods to the non-conducing base material. These methods can all be utilized depending on selected matrix material to create the first layer of conductive material.

Atop this layer of X-axis traces an electro luminescent film layer is added such as an acrylic encapsulated with tin sulfide copper-doped halide-modified material or plastic material designed to be luminescent under an alternating electric field, or other material known in the art for this purpose.

The third layer includes a set of conductive traces on the Y-axis (or traces orthogonally oriented to the first layer of traces). This third layer trace pattern can be printed in a conductive material, such as, but not limited to, electro conductive polymer, PEDOT, or conductive transparent metals such as indium tin oxide or any others that are common in the art. This conductive material should be transparent as for display of images.

Another class of transparent conductor which functions well for small addressable traces that has good transparency and conductivity for very thin layers, is carbon nanotube film. Both single walled nanotubes (SWNT's) and multi-walled nanotubes (MWNT's) are suitable in films which are mostly transparent to visible light. Carbon nanotube manufacturing costs have been declining steadily and liquid dispersions of carbon nanotubes have been found to make good films of high enough quality for this invention.

This trace pattern can also be ablated, wherein a film of conductive material is applied and subsequent to its curing, a pattern is ablated from such conductive material, to create a pattern of Y-axis traces of conductive transparent material. A preformed circuit in an appropriate pattern can also be affixed to the carrier film such as carbon nanotube film. Methods of application of this conductive material include, but are not limited to, flexor gravure, offset printing, (subtractive) laser-ablation, silkscreen, chemical vapor deposition, vacuum sputtering, photolithography, electroforming, inkjet, or other circuit pre-made and affixed by means of adhesive or other method to the carrier film. These methods and others can be utilized depending on specifications for the application. A fourth layer can be a film of transparent or opaque carrier film, plastic, paper, glass, ceramic, or any other material known in the art.

The resonant frequencies of each trace are activated to generate power and this pre-tuned frequency resonance of the intersections of, or Cartesian solutions for, the X- and Y-axes, create a current, the power of which will activate the electroluminescent material and create an activated pixel of light at each intersection. Over the screen at rapid speed, this creates the display addressed by the resonant frequency matrix unit, connected to a tuning chip, which translates the incoming data from the television receiver or computer.

The addition of a visually transparent mask layer upon which has been printed a visually opaque black mask in visually opaque ink in a grid pattern that corresponds with the Cartesian coordinates of the intersection of X- and Y-axes, delineates the burst of light into a pixel-like shape with cleaner edges, thereby generating a screen dot or other shape, or point of light, which works together with the others to create the moving images in an orderly fashion wherein the light from one pixel does not unduly cloud or diffuse the next. This mask creates the screen or filter definition for each pixel printed at the appropriate resolution for the grid. Utilization of directional light conducting materials can perform a similar function.

In addition to the outer edge pixel masking, within the transparent areas, dyes in red, green and blue are commonly used to create the familiar red, green and blue pixels that comprise the screen images that mimic lifelike color. For the resonant frequency matrix disclosed herein, the same dye treatment shall be applied when selected as an appropriate option for RGB images, and image information from the TV or other signal is translated according to the application and selected grid patterns to customize resonant frequency generation to activate the pixels which generate the appropriate RGB image.

A plurality of similar color activations can be used in this invention depending on the application, including but not limited to, inks, e-inks, cyan, magenta, yellow, black color separation technology, selected premixed ink or dye colors, selected premixed ink or dye colors in metallic, iridescent, pearlescent, microencapsulated materials (E-ink, Gyricon, NTerra, Sipix), electrophoretic, choloresteric, electrochromic, electrowetting, liquid crystal, or other varied finishes or materials. The surface of the overlay color material or the luminescent material can be tailored to accomplish a plurality of objectives at various resolutions and at various sizes.

The resonant frequency matrix can be used to power any of the current technologies for display manufacturing. The simplicity of the function and manufacturing for the resonant frequency matrix make it a suitable, effective and efficient alternative that reduces cost and energy usage. The use of AC over the Cartesian-style matrix creates an elegant low-profile activation grid, generating pixels over a broad range of light emitting materials and methods.

Since integrated circuitry dedicated to each pixel is not needed to activate each pixel, the complexity of circuitry is greatly reduced in the displays disclosed herein. Therefore, the thickness of the display unit can be reduced to a fraction of that generated by traditional display manufacturing methods. In the resonant frequency matrix method, only the thickness of the preprinted substrates with the X- and Y-traces, the activation material sandwiched, and any filtering layers or methods used as aperture and colorants for the light emitted at each X- and Y-intersection point comprise the profile of the display. The translation and conversion of the video signal to the appropriate bandwidths to activate the specific Cartesian coordinates of selected pixels in each of the RGB colors create the display image using the resonant frequency matrix.

Modification to existing display structure or methods may be required in some cases when utilizing the resonant frequency matrix to power the display. For example, anything that is typically DC accessed is only using half the waveform. This is significant because the pixel may need either more activation light emitting, more volume of emitting material, or more frequent accessing to compensate for the loss of light over time, to create an equal amount of display light. This can be achieved by tandem circuits or layers each utilizing half the waveform. Because of the advantages of the resonant frequency matrix activation method, even with these modifications display embodiments created with the resonant frequency matrix would still recognize benefit in cost and manufacturing, as well as resolution quality and a greatly thinner profile.

Electroluminescent phosphors are dependent on a higher voltage alternating current to activate light emission. LED technology works by a DC bias of much lower voltage than electroluminescent phosphors, which is a significant advantage, but if an alternating signal is applied it will take only one half of the alternating waveform, bypassing the other half. The alternating signal on the traces of the resonant frequency matrix does, however, have an address density advantage over DC signaling and the initial half wave emission characteristic of LEDs may be compensated by quicker repetition via resonant pixel activation. Electroluminescent material can be incorporated into a curable polymer matrix and applied like ink and cured after application by inexpensive heat or UV activation. Most effective LED/OLED applications are applied by CVD or ink jet or other means requiring a more restricted manufacturing environment. A resonant addressing scheme allows DC addressing to a greater degree, so rather than have the waveform skip a beat every time it is illuminated it can be accessed a greater number of times per second than by DC addressing.

Crosstalk between close tolerance traces is minimal for resonant frequency matrix display applications. Tolerances required for very low amperage currents reduce inductive crosstalk possibilities and are at more of a minimum than the electric field crosstalk because of the higher voltages being used. High voltage does not seem to be a limiting factor of any serious significance with already existing LCD back lit displays. Voltages applied to the electroluminescent resonant frequency matrix display have a higher voltage than the LCD gates, and the traces in the RF display are on the same scale of distance. There are other concerns about the localized arcing caused by mediated defects in the film.

Minimal crosstalk can be accomplished by splitting the AC field in half by inverting half the signal in one plane of traces and inverting the intersecting traces on the other plane. Another method for minimizing voltage levels is to fabricate small elevated point-like defects on the traces themselves which would tend to concentrate charges in the emissive region of each pixel.

Various waveforms can be effective with the waveform influencing the duration and quantity of electrons activated. While on a sine wave the amplitude increases as current increases, on a square wave there is a rise time that is completely or nearly vertical with no x-axis component, chopped at the top, with a flat x-axis component at the top, and its fall time is a mirror image of the rise time, with the longest duration at the highest point of amplitude, giving it the name square wave. This is a preferred waveform embodiment although others are also effective such as sine wave or triangular shaped wave.

Cholesteric displays, electrophoretic displays, and electrochromic displays can also be created incorporating the resonant frequency matrix for addressing the individual pixels of the displays. The cholesteric displays, electrophoretic displays, and electrochromic displays can C include cholesteric material, electrophoretic material, or electrochromic material for emitting electromagnetic radiation in response to alternating current conducted in both the first and second electrically conductive traces. For example, cholesteric liquid crystals, electrophoretic suspension, or electromeric material can be can be used to emit electromagnetic radiation in a display when alternating current is conducted in adjacent conductive traces. The electromagnetic radiation in response to alternating current conducted in both the first and second electrically conductive traces can be produced according to the methods set forth herein by placing cholesteric material, electrophoretic material, or electrochromic material between intersections of the X- and Y-axis traces.

Many additional display constructs exist. The resonant frequency matrix can be used to address individual pixels (or portions) of any type of display conventionally using dense matrix circuitry to address individual pixels. Thus, the teachings set forth herein have a broad range of application to any display constructs currently known, or that become known in the future.

III. Additional Examples of Processes for Manufacturing a Resonant Frequency Matrix Any of the embodiments discussed herein can be adapted to several manufacturing processes. For example, referring to FIG. 19, a flow diagram illustrating an example method for manufacturing a resonant frequency matrix is shown. At 1900, a non-conductive substrate is provided. The substrate can be made from a non-conductive base material that can be sized appropriately for a particular application. Examples of suitable insulated material include, but are not limited to, glass, plastic, or ceramic.

At 1905, an X-axis trace array is applied to the top surface of the substrate. Many different types of conductor material can be used to produce the trace arrays and other circuit components. For example, in addition to transparent conductors, such as tin oxide, indium tin oxide, cadmium stannate and zinc oxyflouride, a new class of organic plastic transparent conductors such as PEDOT materials, for example, are suitable as well. PEDOT can be cross linked from the monomer form or used in a waterborne dispersion that forms a clear conductive film when dried, and is a suitable economical alternative to the sputtering of ITO and other inorganic coatings. Transparent carbon nanotube film can also be used and is a class of conductive transparent material well-suited for many applications and embodiments discussed herein. The RF-activated circuit constructs disclosed herein can also be tailored or customized with material selection best suited to the requirements of a given application.

The trace material can be transparent and/or opaque depending on the application of the materials. Examples of suitable methods for application of the conductive material to the substrate include, but are not limited to, flexo, gravure, offset printing, (subtractive) laser-ablation, silkscreen, chemical vapor deposition, vacuum sputtering, photolithography, electroforming, nanoimprinting, transfer printing, and/or inkjet. The traces and other circuit components of the display can also be pre-made and affixed to the substrate, for example by means of adhesive or other attachment method. Any one, or combination of, these processes, as well as others, can be utilized to create the first layer of conductive material.

According to an embodiment, the pattern of X-axis traces can be printed or applied at the desired resolution or lines per inch with a pattern compatible with selected capacitors or inductors. For example, an electroless solution reduction process can be used to apply silver, or other, metallic material to the top surface of the substrate. A 'Dow Process' for creating aluminum traces can also be used by printing the traces and applying a finish wash.

The X-axis trace pattern can be printed in a conductive medium, or a film of conductive material. For example, conductive material suitable for such traces includes, but is not limited to, electro conductive polymer, PEDOT. Conductive transparent metals such as indium tin oxide or others that are common in the art can also be used. Opaque metals or other conductive material can also be used. A preconstructed film of conductive carbon nanotube can be utilized as well.

At 1910, material is produced over at least a portion of the X-axis traces. The material changes a property in response to a stimulus when alternating current is conducted both above and below the material. The material can be an active or reactive material. According to reactive embodiments, the material changes a property in response to a stimulus originating from the matrix. For example, the material reacts to alternating currents, or heat produced by alternating currents conducted through the traces by changing a property of the material. According to active embodiments, the material changes a property in response to a stimulus originating from a source other than the matrix.

The material can be any material that changes a chemical property, spectral property, optical property, electric property, piezoelectric property, biological property, thermal property, mechanical property, molecular cohesion of the material, elasticity of the material, thermal expansion of the material, catalysis of the material, or luminescence of the material (or a E combination of properties) in response to a stimulus, such as application of alternating currents, an electric, magnetic, mechanical, chemical, biological, optical, electro-magnetic, particle displacement, acoustic, or thermal stimulus.

The material can be an electroluminescent film layer such as an acrylic polymer encapsulated with tin sulfide copper-doped, halide-modified material or plastic material designed to be luminescent under an alternating electric field, or other material discussed herein or known in the art for this purpose. The electroluminescent material can be a pigment in a monomer suspension (i.e. ink). The material can also be a material that catalyzes in response to the alternating current thereby changing a mechanical property of the material. The material can also be an active material that changes a property of the material in response to a stimulus originating from a source other than the matrix. The material can be a sheet of material applied over the X-axis traces or can be islands of material applied at points where X-axis traces will intersect Y-axis traces. Different types of material can be applied at different locations to have different reactions to the application of alternating current at the different locations.

At 1915, Y-axis conductive traces are produced over at least a portion of the material. The Y-axis layer of conductive traces can be produced perpendicular to the X-axis layer of conductive traces or at any angle to the X-axis trace array.

The Y-axis trace pattern can be produced in accordance with any of the processes discussed herein regarding production of the first layer of X-axis traces, as well as others. For example, the Y-axis trace layer can be printed in a conductive material, such as, but not limited to, electro conductive polymer, such as PEDOT, or conductive transparent metals such as indium tin oxide or any others that are common in the art. This conductive material can be transparent or opaque depending on the particular application. For example, the use of transparent conductive material can be particularly advantageous for displays. The third layer can also be a smooth high quality transparent glass or plastic film with preprinted Y-axis traces with transparent conductor material.

Another class of transparent conductor, which functions well for small addressable traces and has good transparency and conductivity for very thin layers, is carbon nanotube film. Both single-walled nanotubes (SWNTs) and multi-walled nanotubes (MWNTs) are suitable in films which are mostly transparent to visible light. Carbon nanotube manufacturing costs have been declining steadily and liquid dispersions of carbon nanotubes have been found to make particularly good films of high enough quality for many embodiments.

The Y-axis trace pattern can also be ablated, wherein a film of conductive material is applied and subsequent to its curing, a pattern is ablated from such conductive material, to create a pattern of Y-axis traces of conductive transparent material. A preformed circuit in an appropriate pattern can also be affixed to the carrier film such as carbon nanotube film. Methods of application of this conductive material include, but are not limited to, flexor gravure, offset printing, (subtractive) laser-ablation, silkscreen, chemical vapor deposition, vacuum sputtering, photolithography, electroforming, inkjet, or other circuit pre-made and affixed by means of adhesive or other methods to the carrier film; these and others can be utilized depending on specifications for the application.

The X- and Y-axis layers are affixed about the material. For example, the X- and Y-axis layers can be registered with respect to the other layer, pressed together with ultra-violet or heat applied to cure and bond the layers. Any means for affixing the layers can be used.

Figure 20:
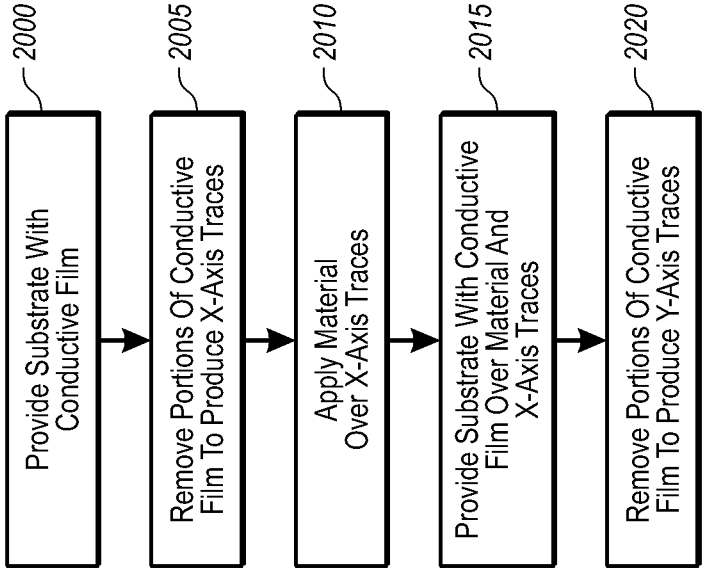
FIG. 20 is a flow diagram illustrating a method for producing a display.

Additional layers can be applied depending on the application. For example, a fourth layer can be produced over the third layer. The fourth layer can be a film of selectively transparent carrier film, plastic, glass, ceramic, or any other material that may be familiar in the art. This fourth layer can provide protection of the underlying layers, include colors and images, and provide mechanical interfaces for electrical connections to controllers, rigidity if desired, or can be applied for other purposes. The surface of an overlaid color material, or the material, can be tailored to accomplish a plurality of objectives at various resolutions and at various sizes. Multiple additional layers including arrays of additional traces and layers of material can be created, for example as discussed above with reference to FIGS. 3A and 3B, As discussed above, the traces can be produced using a subtractive process, such as laser ablation. Referring to FIG. 20, a method for producing a display is illustrated. At 2000, a substrate is provided with a conductive film. The substrate and conductive film can be at least partially translucent. At 2005, a portion of the conductive film is removed to produce X-axis traces. The conductive film can be removed using a laser ablation process. The conductive film can be laser ablated in specific locations leaving the X-axis traces. The traces can include tin oxide, indium tin oxide, cadmium stannate, zinc oxyflouride, poly(3,4-ethylenedioxythiophene), and/or carbon nanotubes, for example. Resonant frequency selective filters, such as capacitors and/or inductors, can be produced to provide the resonant frequency busses. These resonant frequency selective filters can be discrete components and/or a single multi-tapped inductor as discussed above.

At 2010, a material is applied over at least a portion of the X-axis traces. The material can be a sheet of material or can be "islands" of material, which can be applied at locations of intersection upon the X-axis traces. The material changes a property in response alternating current. The material can be an active or reactive material as discussed above. The property can be a chemical property, spectral property, optical property, electric property, piezoelectric property, biological property, thermal property, mechanical property, molecular cohesion of the material, elasticity of the material, thermal expansion of the material, catalysis of the material, and/or luminescence of the material. The material can change a property by emitting electromagnetic radiation, such as visible light to present images, such as those displayed by conventional displays. The material can be applied by a lithographic process, for example.

At 2015, a substrate with a conductive film is placed over the material and X-axis traces. The substrate and/or conductive film can be at least partially translucent. At 2020, a portion of the conductive film is removed to produce Y-axis traces. The conductive film can be removed using a laser ablation process. The conductive film can be laser ablated in discrete locations leaving the Y-axis traces. The Y-axis traces can include tin oxide, indium tin oxide, cadmium stannate, zinc oxyflouride, PEDOT, and/or carbon nanotubes, for example. Resonant frequency selective filters, such as capacitors and/or inductors, can be produced to provide the resonant frequency busses for the Y-axis traces. These resonant frequency selective filters can be discrete components or a single multi-tapped inductor as discussed above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A display comprising:

a first array of first electrically conductive traces configured to conduct alternating current, each of the first electrically conductive traces being coupled to a first microelectromechanical system (MEM) surface acoustic wave (SAW) frequency selective filter;

a second array of second electrically conductive traces configured to conduct alternating current, each of the second electrically conductive traces being coupled to a second microelectromechanical system (MEM) surface acoustic wave (SAW) frequency selective filter;

a material located between at least a portion of the first array and the second array, the material having a property that changes to cause illumination in response to current conducted in one or more of the first electrically conductive traces and current conducted in one or more of the second electrically conductive traces; and a driver circuit electrically coupled to the first array and/or the second array, the driver circuit including:

a first signal generator configured to generate a first clock synchronized frequency sweeping signal; and a first gate synchronized to the first signal generator, the first gate being configured to open in response to a first trigger signal to allow a first frequency selected portion of the first clock synchronized frequency sweeping signal to pass the first gate and be conducted to the first array and/or the second array.

2. A display according to claim 1, wherein each MEM SAW frequency selective filter acts as a band-pass gate for a trace of the first or second trace array.

3. A display according to claim 1, further comprising:

means for extending the duration and/or intensity of the illumination.

4. A display according to claim 3, wherein the means for extending the duration and/or intensity of the illumination includes a photoconductive material.

5. A display according to claim 4, wherein the photoconductive material is coupled to a voltage source.

6. A display according to claim 3, wherein the means for extending the response of the material to the stimulus includes selenium, arsenic, tellurium, sulfur, and/or silver, or a compound incorporating one or more of selenium, arsenic, tellurium, sulfur, and/or silver.

7. A display according to claim 1, wherein the first signal generator is configured to generate the first clock synchronized frequency sweeping signal between a high frequency signal associated with a high frequency MEM SAW frequency selective filter and a low frequency signal associated with a low frequency MEM SAW frequency selective filter.

8. A display according to claim 7, wherein the first signal generator is configured to repetitively sweep the clock synchronized frequency sweeping signal from the high frequency signal to the low frequency signal and/or is configured to repetitively sweep the clock synchronized frequency sweeping signal from the low frequency signal to the high frequency signal.

9. A display according to claim 1, wherein the first trigger signal includes a digital video signal.

10. A display according to claim 9, wherein the digital video signal includes a digital video disk (DVD) signal generated by a DVD player.

11. A display circuit according to claim 1, further comprising:

a second signal generator configured to generated a second clock synchronized frequency sweeping signal; and a multiplexing device configured to multiplex the first and second clock synchronized frequency sweeping signals.

12. A display according to claim 1, further comprising:

a second gate synchronized to the first signal generator, the second gate being configured to open in response to a second trigger signal to allow a second frequency selected portion of the first frequency sweeping signal to pass the second gate;

the first array of MEM SAW frequency selective filters being coupled to the first gate of the driver circuit; and the second array of MEM SAW frequency selective filters being coupled to the second gate of the driver circuit.

13. A display according to claim 12, further comprising:

a third gate synchronized to the first signal generator, the third gate being configured to open in response to a third trigger signal to allow a third frequency selected portion of the first frequency sweeping signal to pass the third gate;

a third array of MEM SAW frequency filters coupled to the third gate of the driver circuit; and a third array of traces coupled to the third array of MEM SAW frequency filters.

14. A display according to claim 13, wherein the first array of traces are associated with illumination of red pixels of the display, the second array of traces are associated with illumination of green pixels of the display, and the third array of traces are associated with illumination of blue pixels of the display.

15. A circuit according to claim 12, further comprising:

a fourth gate synchronized to the signal generator, the fourth gate being configured to open in response to the first, second, and third trigger signals to allow a fourth frequency selected portion of the first frequency sweeping signal to pass the fourth gate;

a fourth array of MEM SAW frequency filters coupled to the driver circuit; and a fourth array of traces coupled to the fourth array of MEM SAW frequency filters.

16. A circuit according to claim 15, wherein the fourth array of traces are associated with illuminating the red, green, and blue pixels of the display.

17. A display according to claim 1, wherein points of intersection between the first array and the second array define illumination pixels of the display.

18. A display according to claim 1, wherein the material includes a organic light emitting diode (OLED) material.

19. A display according to claim 1, wherein the material includes a light emitting diode material.

20. A display according to claim 1, wherein the material includes a corona emitting gaseous material.

21. A display according to claim 1, wherein the material includes a carbon nanotubes material.

22. A display according to claim 1, wherein the material includes an electro-luminescent material.

23. A display according to claim 1, wherein the material includes an emissive phosphor material.

24. A display according to claim 1, wherein the material includes a liquid crystal material.

25. A display comprising:

a first array of first electrically conductive traces, the first array of first electrically conductive traces configured to conduct an alternating current, each of the first electrically conductive traces having a different associated characteristic resonant frequency;

a first signal generator configured to generate a first clock synchronized frequency sweeping signal;

a first gate configured to open in response to a first trigger signal to allow a first frequency selected portion of the first clock synchronized frequency sweeping signal to pass the first gate and be conducted to the first array of first electrically conductive traces;

a second array of second electrically conductive traces configured to conduct an alternating current, each of the second electrically conductive traces having a different associated characteristic resonant frequency, wherein intersections of the first electrically conductive traces and the second electrically conductive traces define a two-dimensional grid of pixels of the display;

a second gate configured to open in response to a second trigger signal to allow a second frequency selected portion of the first clock synchronized frequency sweeping signal, or an additional frequency sweeping signal, to pass the second gate and be conducted to the second array of second electrically conductive traces; and a material located between at least a portion of the first array and at least a portion of the second array, the material having a property that changes in response to a stimulus to cause illumination.

26. A display according to claim 25, further comprising a photoconductive layer adjacent to the first and/or second arrays.

27. A display according to claim 25, wherein the material includes a carbon nanotube material.

28. An electroluminescent display comprising the matrix according to claim 25, wherein the material includes an electro-luminescent material.

29. A plasma display comprising the matrix according to claim 25, wherein the material includes a corona emitting gaseous material.

30. A display according to claim 25, wherein the material includes a LED or OLED material.

31. A display according to claim 25, wherein the material includes an emissive phosphor material.

32. A display according to claim 25, wherein the material includes a liquid crystal material.

33. A display according to claim 25, further wherein:

each of the first electrically conductive traces are coupled to a first microelectromechanical system (MEM) surface acoustic wave (SAW) frequency selective filter; and each of the second electrically conductive traces are coupled to a second microelectromechanical system (MEM) surface acoustic wave (SAW) frequency selective filter.

34. A display according to claim 33, wherein each MEM SAW frequency selective filter acts as a band-pass gate for the associated frequency of a trace of the first or second trace array.

* * * * *